(12) United States Patent
Akkarakaran et al.

(10) Patent No.: US 11,139,941 B2
(45) Date of Patent: Oct. 5, 2021

(54) UPLINK ACKNOWLEDGMENT MAPPING AND RESOURCE ALLOCATION

(71) Applicant: QUALCOMM Incorporated, San Diego, CA (US)

(72) Inventors: Sony Akkarakaran, Poway, CA (US); Renqiu Wang, San Diego, CA (US); Yi Huang, San Diego, CA (US); Tao Luo, San Diego, CA (US); Juan Montojo, San Diego, CA (US); Seyong Park, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/126,993

(22) Filed: Sep. 10, 2018

(65) Prior Publication Data
US 2019/0081763 A1     Mar. 14, 2019

Related U.S. Application Data

(60) Provisional application No. 62/557,103, filed on Sep. 11, 2017.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/0026* (2013.01); *H04L 1/1607* (2013.01);
(Continued)

(58) Field of Classification Search
CPC ........... H04W 72/0413; H04W 72/042; H04W 88/023; H04W 72/1289; H04L 5/0007
See application file for complete search history.

(56) References Cited

U.S. PATENT DOCUMENTS

| 2014/0119284 A1* | 5/2014 | Baldemair | H04L 5/003 370/328 |
| 2014/0126484 A1* | 5/2014 | Chen | H04L 5/0055 370/329 |
| 2019/0124647 A1* | 4/2019 | Li | H04L 1/1671 |

OTHER PUBLICATIONS

International Search Report and Written Opinion—PCT/US2018/057378—ISA/EPO—dated Feb. 19, 2019.
(Continued)

*Primary Examiner* — Iqbal Zaidi
(74) *Attorney, Agent, or Firm* — QUALCOMM Incorporated

(57) ABSTRACT

Aspects of the disclosure relate to a scheduled entity that obtains a resource allocation for transmission of an acknowledgment (ACK)/negative acknowledgment (NACK) payload using implicit resource mapping based on at least one of a scrambling identifier or one of a plurality of control resource sets (CORESETs) and transmits the ACK/NACK payload based on the obtained resource allocation. In an aspect, a scheduled entity obtains a resource allocation for transmitting different types of uplink control information (UCI), wherein the resource allocation is based on a combination of the different types of UCI and transmits the different types of UCI based on the obtained resource allocation. Other aspects, embodiments, and features are also claimed and described.

36 Claims, 18 Drawing Sheets

(51) Int. Cl.
　　　*H04L 1/16*　　　　(2006.01)
　　　*H04L 1/00*　　　　(2006.01)
　　　*H04W 72/04*　　　(2009.01)
(52) U.S. Cl.
　　　CPC .......... *H04L 1/1812* (2013.01); *H04L 1/1861* (2013.01); *H04L 5/0053* (2013.01); *H04W 72/0413* (2013.01)

(56) References Cited

OTHER PUBLICATIONS

LG Electronics: "Consideration on Resource Allocation for NR-PUCCH", 3GPP Draft; R1-1713181 Consideration on Resource Allocation for NR-PUCCH, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051315990, Retrieved from the Internet: URL:http://www.3gpp.org/ftp/Meetings_3GPP_SYNC/RAN1/Docs/ [retrieved on Aug. 20, 2017], 7 pages.
Partial International Search Report—PCT/US2018/050466—ISA/EPO—dated Dec. 14, 2018.
Qualcomm Incorporated: "Resource Allocation for PUCCH", 3GPP Draft; R1-1711194 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051300393, Retrieved from the Internet: URL:http://www.3gpp.org/ftp/Meetings_3GPP_SYNC/RAN1/Docs/ [retrieved on Jun. 26, 2017], 4 pages.

\* cited by examiner

UPLINK ACKNOWLEDGMENT MAPPING AND RESOURCE ALLOCATION

PRIORITY CLAIM

The present application for patent claims priority to U.S. Provisional Application No. 62/557,103 entitled "UPLINK ACKNOWLEDGMENT MAPPING AND RESOURCE ALLOCATION" filed Sep. 11, 2017, which is assigned to the assignee hereof and hereby expressly incorporated by reference herein in its entirety and for all applicable purposes.

TECHNICAL FIELD

The technology discussed below relates generally to wireless communication systems, and more particularly, to facilitating uplink transmissions. Certain embodiments can provide and enable techniques for uplink acknowledgment mapping and resource allocation in next generation (e.g., 5G) wireless networks with minimal overhead and low interference levels.

INTRODUCTION

In wireless networks, a scheduled entity (e.g., user equipment (UE)) may transmit uplink control information (UCI) to a scheduling entity (e.g., base station, network access gateway, eNodeB). UCI can include acknowledgment (ACK)/negative acknowledgment (NACK) messaging. Generally before sending UCI, a scheduled entity may need to obtain resources (e.g., the resource block allocation, ACK/NACK payload mapping) allocated for transmitting UCI.

As the demand for mobile broadband access continues to increase, research and development continue to advance wireless communication technologies not only to meet the growing demand for mobile broadband access, but to advance and enhance user experiences with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with some aspects of the disclosure, a method for a scheduled entity to communicate with a scheduling entity in a wireless communication network is provided. The scheduled entity can obtain a resource allocation for transmitting an acknowledgment (ACK)/negative acknowledgment (NACK) payload (sometimes referred to as an ACK/NACK payload). The scheduled entity can obtain resources using implicit resource mapping. This mapping can be based on at least one of a scrambling identifier or one of a plurality of control resource sets (CORESETs). The scheduling entity can transmit the ACK/NACK payload based on the obtained resource allocation.

In accordance with some aspects of the disclosure, a method for a scheduled entity to communicate with a scheduling entity in a wireless communication network is provided. The scheduled entity can obtain a resource allocation for transmitting different types of uplink control information (UCI). The resource allocation is based on a combination of the different types of UCI. The scheduling entity can transmit the different types of UCI based on the obtained resource allocation.

In accordance with some aspects of the disclosure, a method for a scheduled entity to communicate with a scheduling entity in a wireless communication network is provided. The scheduled entity can obtain a plurality of downlink control information (DCI) formats from the scheduling entity. Each of the plurality of DCI formats includes a different amount of information for dynamic scheduling. The scheduled entity can obtain an indicator that identifies one of the plurality of DCI formats. The scheduled entity can receive downlink control information based on the identified one of the plurality of DCI formats.

In accordance with some aspects of the disclosure, a method for a scheduled entity to communicate with a scheduling entity in a wireless communication network is provided. The scheduled entity can obtain a resource allocation for transmission of an acknowledgment (ACK)/negative acknowledgment (NACK) payload. The scheduled entity can obtain the resource allocation using an implicit mapping. This mapping identifies an uplink control channel resource based on at least one of a starting resource block index, a first shift index, or a time domain orthogonal cover code (OCC). The scheduled entity can transmit the ACK/NACK payload based on the obtained resource allocation.

In accordance with some aspects of the disclosure, a method for a scheduled entity to communicate with a scheduling entity in a wireless communication network is provided. The scheduled entity can generate one or more channel state information (CSI) reports for a number of component carriers. The number of component carriers may be less than or equal to a threshold. The scheduled entity transmits the one or more CSI reports to the scheduling entity.

In accordance with some aspects of the disclosure, a method for a scheduled entity to communicate with a scheduling entity in a wireless communication network is provided. The scheduled entity can obtain control information from the scheduling entity on a control channel. The scheduled entity can transmit an acknowledgment (ACK) for the control information to the scheduling entity.

In accordance with some aspects of the disclosure, a method for a scheduled entity to communicate with a scheduling entity in a wireless communication network is provided. The scheduled entity can obtain a resource allocation for transmission of an ACK/negative acknowledgment (NACK) payload. The scheduled entity can obtain the resource allocation by mapping to one of a plurality of sequences for a sequence-based transmission of the ACK/NACK payload. The mapping may vary with time based on one or more parameters. The scheduled entity can transmit the ACK/NACK payload based on the obtained resource allocation.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
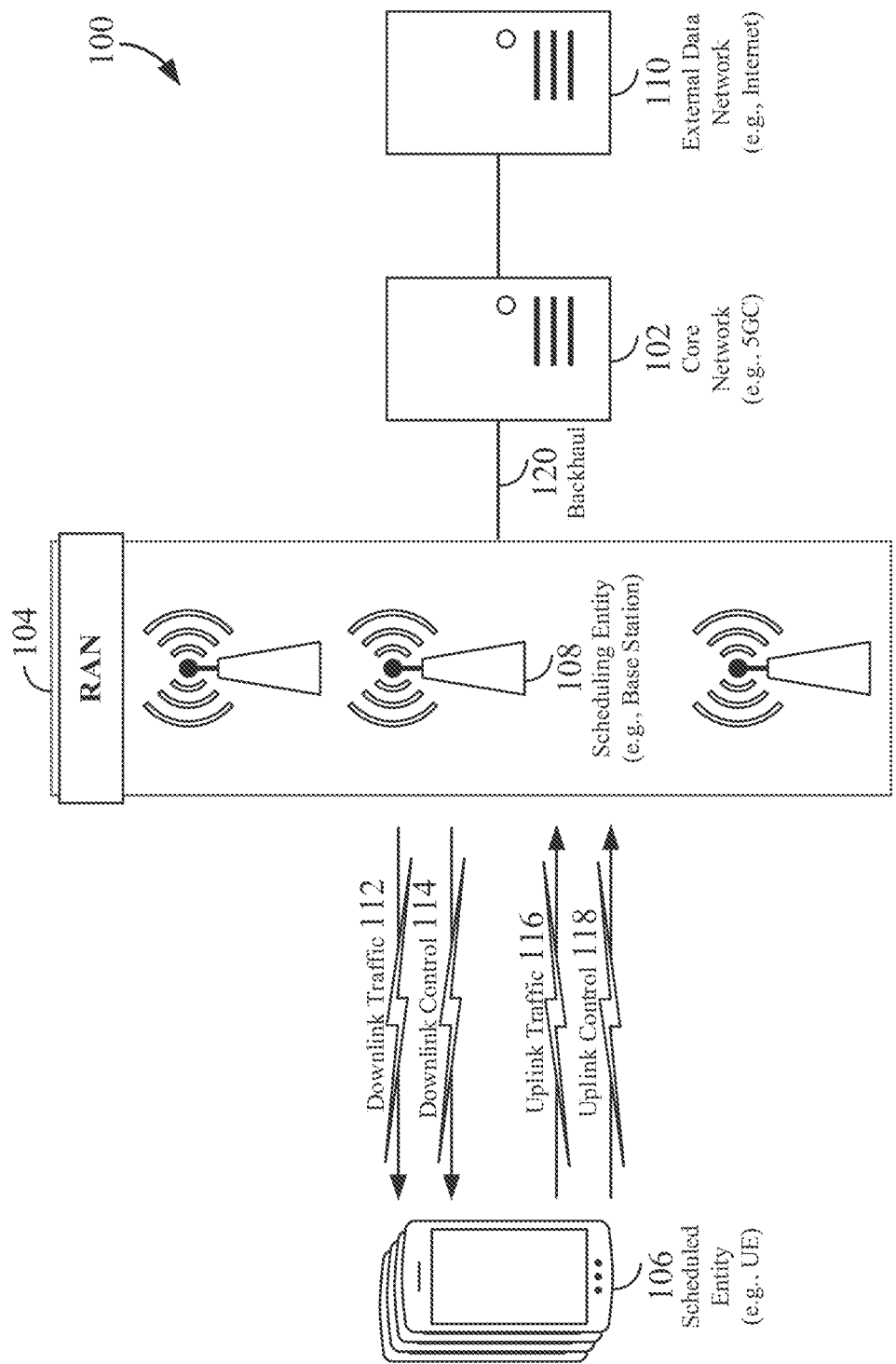
FIG. 1 is a schematic illustration of a wireless communication system according to some embodiments.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As used herein, NR generally refers to 5G technologies and the new radio access technology undergoing definition and standardization by 3GPP in Release 15. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards. In some cases, a mobile apparatus may also be referred as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE can be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. A scheduling entity (e.g., a base station 108) can allocate resources for communication among some or all devices and equipment within its service area or cell. In some scenarios, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., a 5G Core Network). In other examples, the core network 102 may be configured according to a 4G evolved packet core (EPC), or any other suitable standard or configuration.

Figure 2:
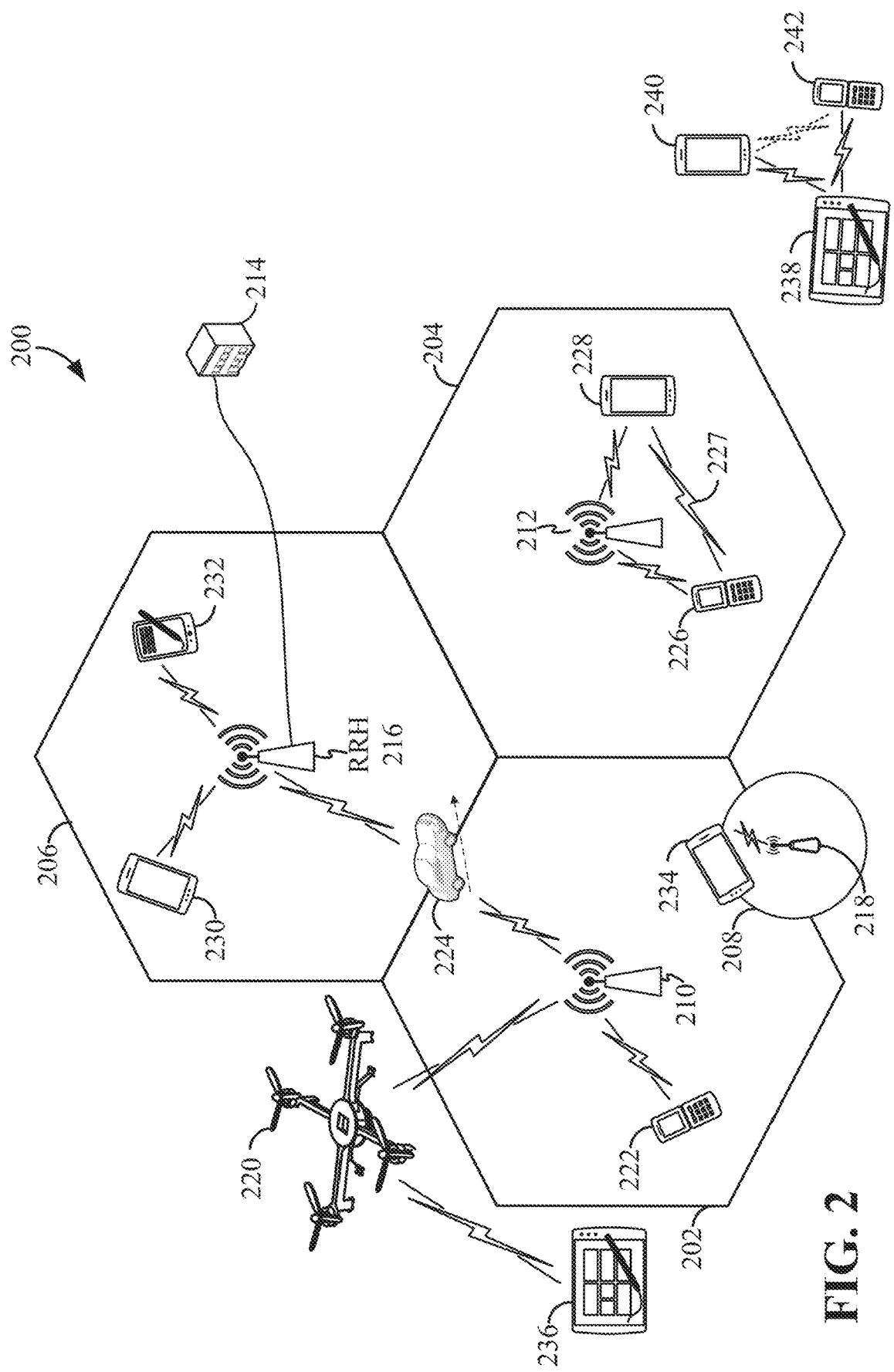
FIG. 2 is a conceptual illustration of an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 also shows various base stations (BSs) as part of RAN 200. Two base stations 210 and 212 are shown in cells 202 and 204; and a third base station 214 is shown controlling a remote radio head (RRH) 216 in cell 206. A base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations, nodes, and cells. As one example, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220. Though not shown, the drone 220 may also be other types of vehicles, including but not limited to, high altitude crafts, aerial-based vehicles, land-based vehicles, or water-going vehicles.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). Mobility features may also include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum. Technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
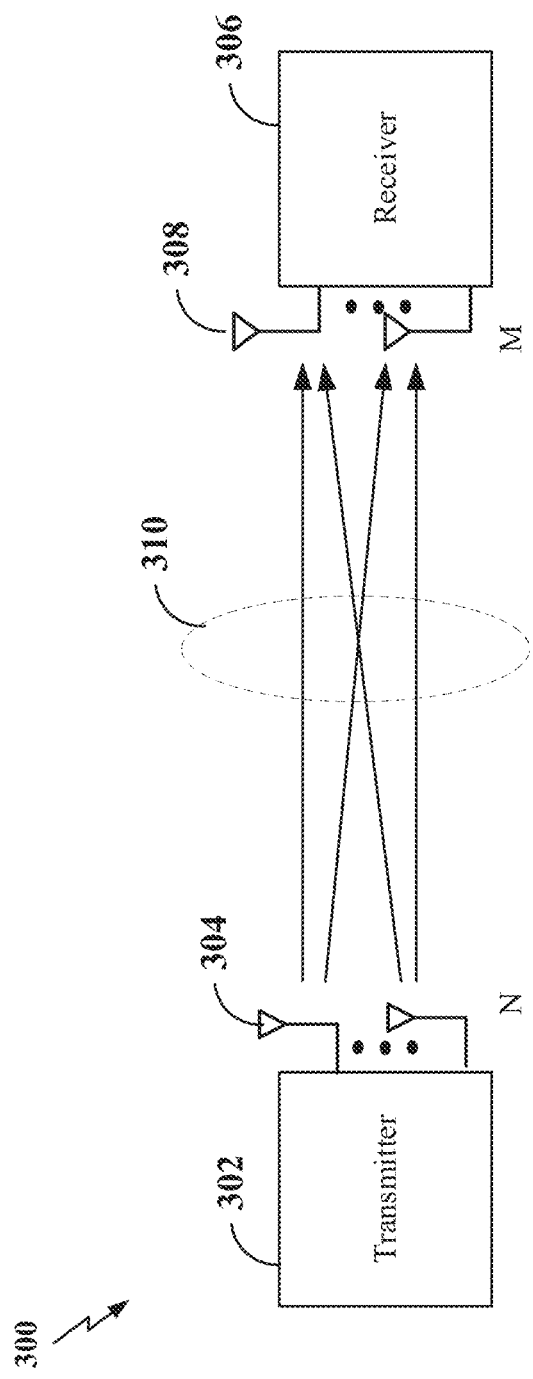
FIG. 3 is a block diagram illustrating a wireless communication system supporting multiple-input multiple-output (MIMO) communication according to some embodiments.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the channel quality indicator (CQI) and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

According to 5G NR specifications, user data is coded using quasi-cyclic low-density parity check (LDPC) with two different base graphs. One base graph can be used for large code blocks and/or high code rates, and another base graph can be used otherwise. Of course, other use cases may be implemented with differing types of base graph combinations. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame generally refers to a logical segment of transmission of a particular time interval. As one example configuration, a frame can refer to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. According to some scenarios, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
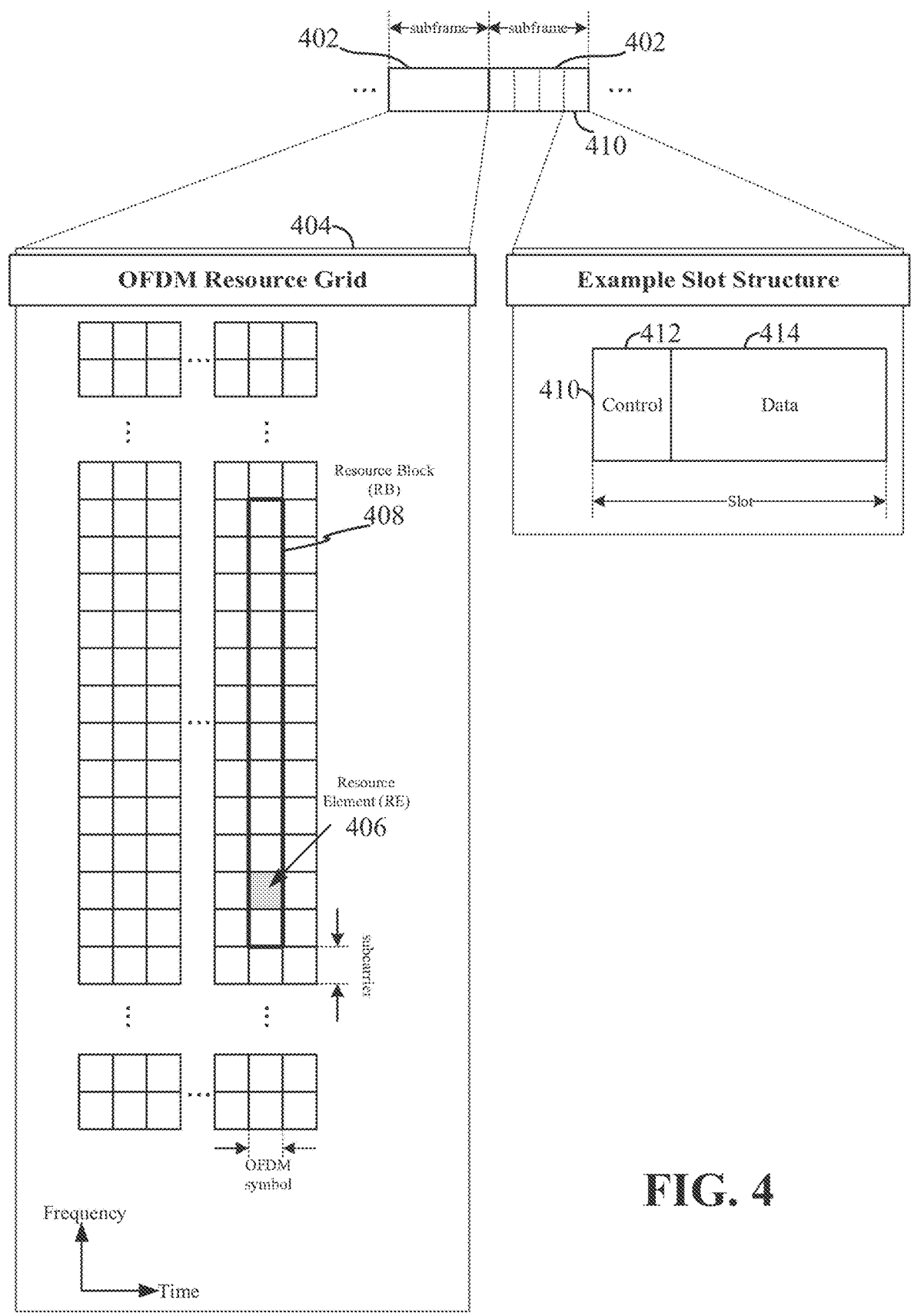
FIG. 4 is a schematic illustration of an organization of wireless resources in an air interface utilizing orthogonal frequency divisional multiplexing (OFDM) according to some embodiments.

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

The DL control information 114 in FIG. 1 will now be described with reference to FIG. 4. In a DL transmission, the transmitting device (e.g., the scheduling entity 108) may allocate one or more REs 406 (e.g., within a control region 412) for carrying DL control information 114 to one or more scheduled entities 106. For example, the DL control information 114 may be associated with one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK).

HARQ is a technique well-known to those of ordinary skill in the art. When HARQ is implemented, the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information (UCI) 118. UCI 118 may include one or more UL control channels, such as a physical uplink control channel (PUCCH), to the scheduling entity 108. UCI 118 may include a variety of packet types and categories, including pilots, reference signals, and information configured to enable or assist in decoding uplink data transmissions. In some examples, the UCI 118 may include a scheduling request (SR), e.g., a request for the scheduling entity 108 to schedule uplink transmissions. Here, in response to the SR transmitted in the UCI 118, the scheduling entity 108 may transmit downlink control information 114 that may schedule resources for uplink packet transmissions. UCI may also include HARQ feedback, channel state feedback (CSF), or any other suitable UCI.

In addition to control information, one or more REs 406 (e.g., within the data region 414) may be allocated for user data or traffic data. This traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
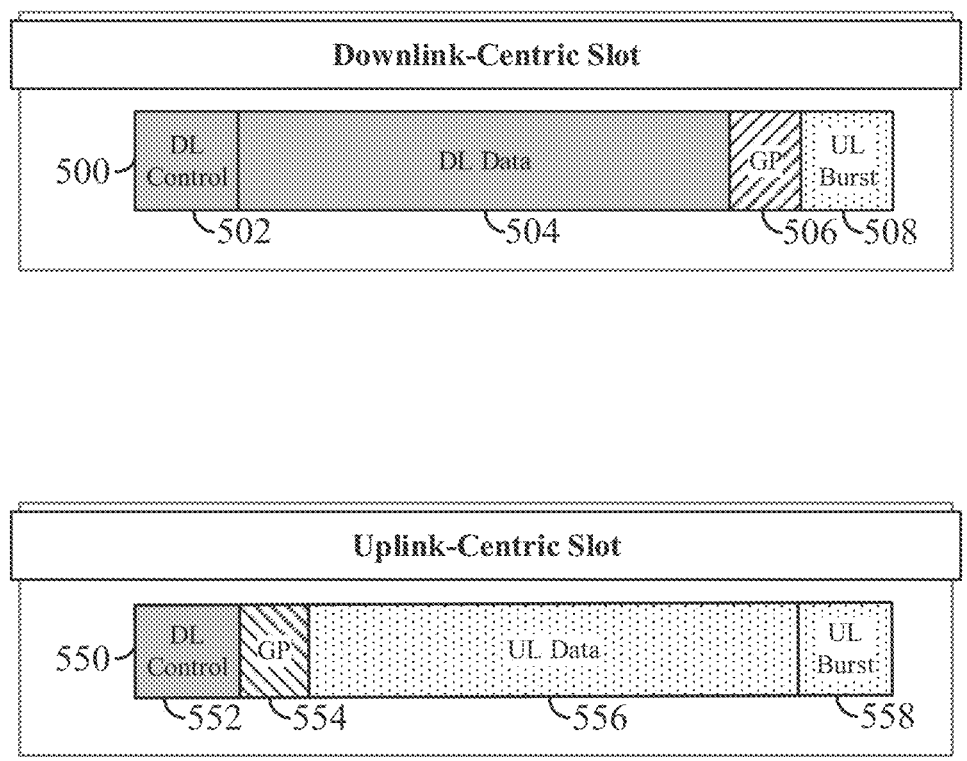
FIG. 5 is a schematic illustration of exemplary self-contained slots according to some aspects of the disclosure.

According to an aspect of the disclosure, one or more slots may be structured as self-contained slots. For example, FIG. 5 illustrates two example structures of self-contained slots 500 and 550. The self-contained slots 500 and/or 550 may be used, in some examples, in place of the slot 410 described above and illustrated in FIG. 4.

In the illustrated example, a DL-centric slot 500 may be a transmitter-scheduled slot. The nomenclature DL-centric generally refers to a structure in which more resources are allocated for transmissions in the DL direction (e.g., transmissions from the scheduling entity 108 to the scheduled entity 106). Similarly, an UL-centric slot 550 may be a receiver-scheduled slot in which more resources are allocated for transmissions in the UL direction (e.g., transmissions from the scheduled entity 106 to the scheduling entity 108).

Each slot, such as the self-contained slots 500 and 550, may include transmit (Tx) and receive (Rx) portions. For example, in the DL-centric slot 500, the scheduling entity 202 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration 510, the scheduling entity 108 has an opportunity to receive UL data and/or UL feedback in an UL burst 508 from other entities using the carrier. For example, the UL feedback may include any UL scheduling requests, CSF, a HARQ ACK/NACK, etc. The DL-centric slot 500 may be referred to as a self-contained slot when all of the data carried in the data region 504 is scheduled in the control region 502 of the same slot and when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 108. Accordingly, the GP region 506 may allow an amount of time after the DL data region 504 to prevent interference. Therefore, the GP region 506 may be configured to provide an appropriate amount of time for the scheduling entity 108 to switch its RF antenna direction. The GP region 506 may be further configured to provide an appropriate amount of time for the over-the-air (OTA) transmission and an appropriate amount of time for ACK processing by the scheduled entity.

Similarly, the UL-centric slot 550 may be configured as a self-contained slot. The UL-centric slot 550 is substantially similar to the DL-centric slot 500, including a DL control region 552, a guard period 554, an UL data region 556, and an UL burst region 558.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Figure 6:
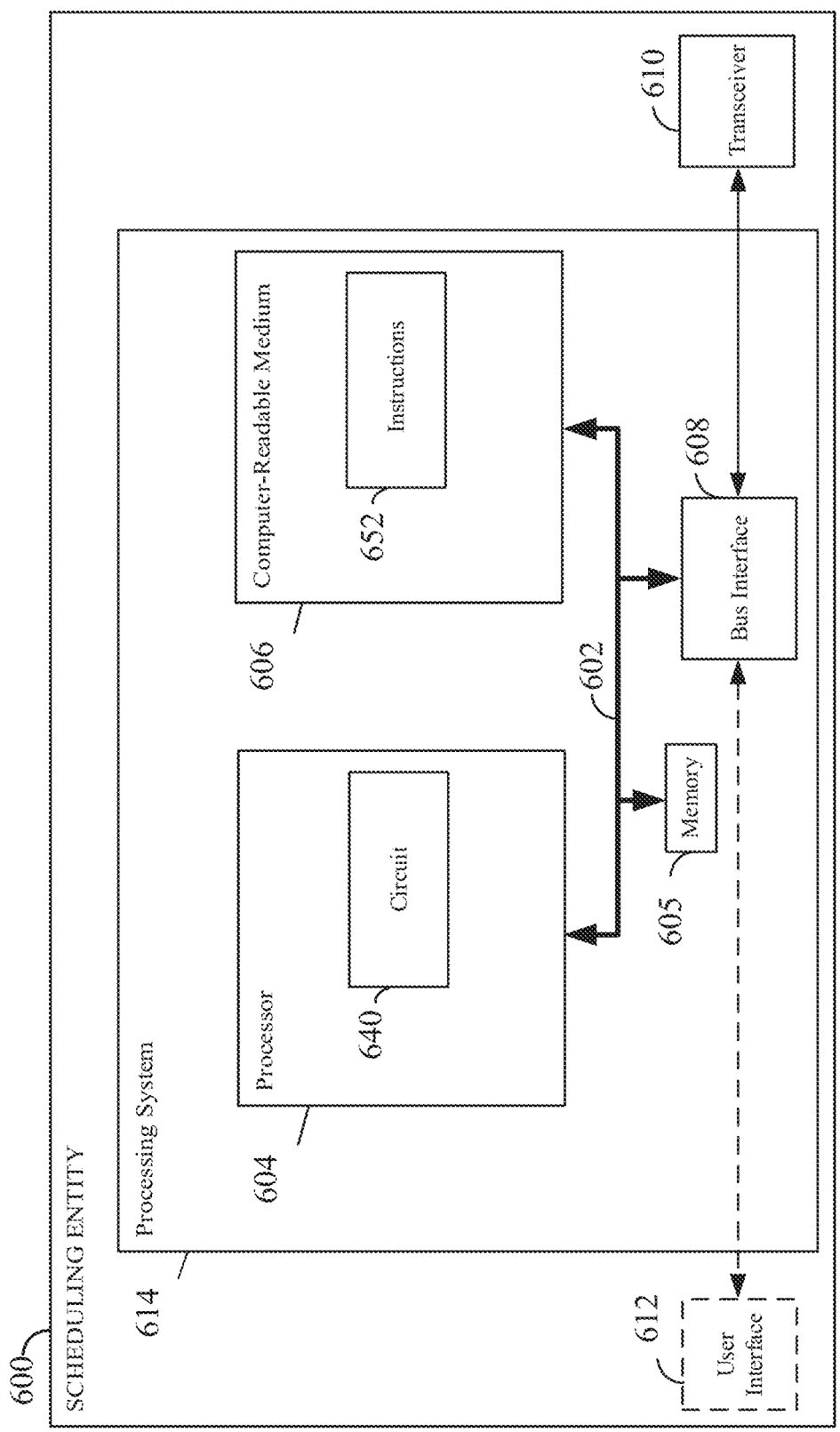
FIG. 6 is a block diagram conceptually illustrating an example of a hardware implementation for a scheduling entity according to some aspects of the disclosure.

FIG. 6 is a block diagram illustrating an example of a hardware implementation for a scheduling entity 600 employing a processing system 614. For example, the scheduling entity 600 may be a base station as illustrated in any one or more of FIGS. 1 and/or 2.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes and procedures described below.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. Of course, such a user interface 612 is optional, and may be omitted in some examples, such as a base station.

In some aspects of the disclosure, the processor 604 may include circuitry (e.g., circuitry 640) configured to perform the various functions described herein. The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include software (e.g., the instructions 652) configured to perform the various functions described herein.

Figure 7:
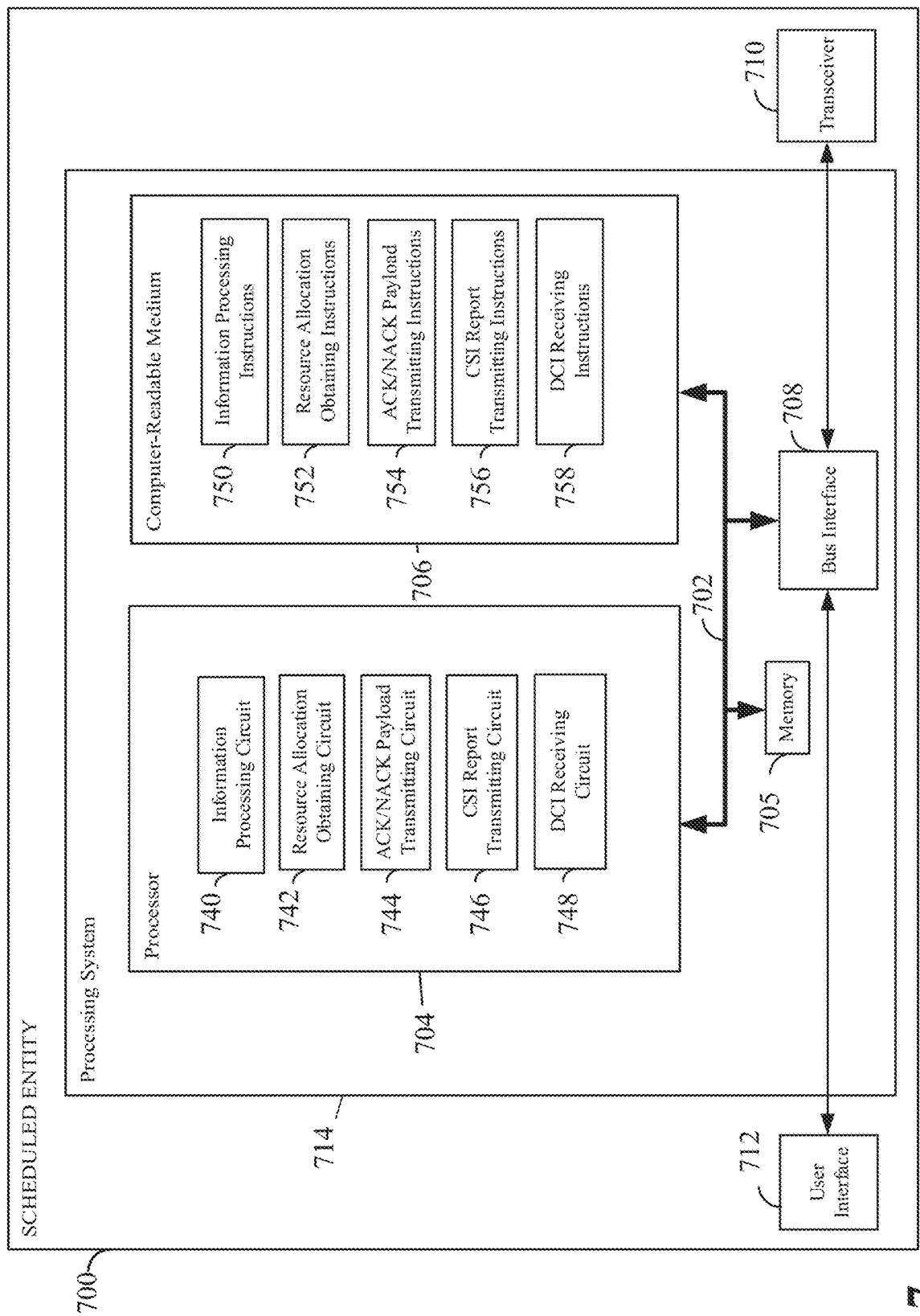
FIG. 7 is a block diagram conceptually illustrating an example of a hardware implementation for a scheduled entity according to some aspects of the disclosure.

FIG. 7 is a conceptual diagram illustrating an example of a hardware implementation for an exemplary scheduled entity 700 employing a processing system 714. In accordance with various aspects of the disclosure, an element, or any portion of an element, or any combination of elements may be implemented with a processing system 714 that includes one or more processors 704. For example, the scheduled entity 700 may be a user equipment (UE) as illustrated in any one or more of FIGS. 1 and/or 2.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6. That is, the processor 704, as utilized in a scheduled entity 700, may be used to implement any one or more of the processes described below and illustrated in FIGS. 12-18.

In some aspects of the disclosure, the processor 704 may include information processing circuitry 740 configured for various functions, including, for example, processing information transmitted from the scheduling entity in at least a first slot, and generating one or more channel state information (CSI) reports for a number of component carriers. For example, the information processing circuitry 740 may be configured to implement one or more of the functions described below in relation to FIGS. 16 and 18, including, e.g., blocks 1602 and/or 1802.

The processor 704 may include resource allocation obtaining circuitry 742 configured for various functions, including, for example, obtaining a resource allocation for transmission of an acknowledgment (ACK)/negative acknowledgment (NACK) payload using implicit resource mapping based on at least one of a scrambling identifier or one of a plurality of control resource sets (CORESETs). For example, the resource allocation obtaining circuitry 742 may be further configured for selecting one of a plurality of resource pools associated with the one of the plurality of CORESETs for transmission of the ACK/NACK payload.

For example, the resource allocation obtaining circuitry 742 may be further configured for determining a size of the ACK/NACK payload. For example, the resource allocation obtaining circuitry 742 may be further configured for obtaining a resource allocation for transmitting different types of UCI. In such example, the resource allocation may be based on a combination of the different types of UCI. For example, the resource allocation obtaining circuitry 742 may be further configured for obtaining a plurality of DCI formats from the scheduling entity. In such example, each of the plurality of DCI formats may include a different amount of information for dynamic scheduling. For example, the resource allocation obtaining circuitry 742 may be further configured for obtaining an indicator that identifies one of the plurality of DCI formats.

For example, the resource allocation obtaining circuitry 742 may be further configured for obtaining a resource allocation for transmission of an ACK/NACK payload. In such example, the resource allocation may be obtained using an implicit mapping that identifies an uplink control channel resource based on at least one of a starting resource block index, a first shift index, or a time domain orthogonal cover code (OCC). For example, the resource allocation obtaining circuitry 742 may be further configured for obtaining control information from the scheduling entity on a control channel. For example, the resource allocation obtaining circuitry 742 may be further configured for obtaining a resource allocation for transmission of an ACK/NACK payload. In such example, the resource allocation may be obtained by mapping to one of a plurality of sequences for a sequence-based transmission of the ACK/NACK payload. The mapping may vary with time based on one or more parameters. For example, the resource allocation obtaining circuitry 742 may be configured to implement one or more of the functions described below in relation to FIGS. 12-18, including, e.g., blocks 1202, 1204, 1206, 1302, 1402, 1404, 1502, 1702, and/or 1804.

The processor 704 may include ACK/NACK payload transmitting circuitry 744 configured for various functions. In some aspects, the ACK/NACK payload transmitting circuitry 744 may be configured to transmit an ACK/NACK payload based on the obtained resource allocation. In some aspects, the ACK/NACK payload transmitting circuitry 744 may be configured to transmit the different types of UCI based on the obtained resource allocation. In some aspects, the ACK/NACK payload transmitting circuitry 744 may be configured to transmit, to the scheduling entity, an ACK for the control information. For example, the ACK/NACK payload transmitting circuitry 744 may be configured to implement one or more of the functions described below in relation to FIGS. 12-18, including, e.g., blocks 1208, 1304, 1504, 1704, and/or 1806.

The processor 704 may include CSI report transmitting circuitry 746 configured for various functions. These functions can include, for example, transmitting one or more CSI reports to a scheduling entity. For example, the CSI report transmitting circuitry 746 may be configured to implement one or more of the functions described below in relation to FIG. 16, including, e.g., block 1604.

The processor 704 may include DCI receiving circuitry 748 configured for various functions. These functions can, include, for example, receiving DCI. The DCI may be based on the identified one of the plurality of DCI formats. For example, the DCI receiving circuitry 748 may be configured to implement one or more of the functions described below in relation to FIG. 14, including, e.g., block 1406.

In one or more examples, the computer-readable storage medium 706 may include information processing software 750 configured for various functions, including, for example, processing information transmitted from the scheduling entity in at least a first slot. For example, the information processing software 750 may be further configured for generating one or more channel state information (CSI) reports for a number of component carriers. In some aspects, the information processing software 750 may be configured to implement one or more of the functions described above in relation to FIGS. 16 and 18, including, e.g., blocks 1602 and/or 1802.

In one or more examples, the computer-readable storage medium 706 may include resource allocation obtaining software 752 configured for various functions, including, for example, obtaining a resource allocation for transmission of an ACK/NACK payload using implicit resource mapping based on at least one of a scrambling identifier or one of a plurality of CORESETs. For example, the resource allocation obtaining software 752 may be further configured for selecting one of a plurality of resource pools associated with the one of the plurality of CORESETs for transmission of the ACK/NACK payload. For example, the resource allocation obtaining software 752 may be further configured for determining a size of the ACK/NACK payload.

For example, the resource allocation obtaining software 752 may be further configured for obtaining a resource allocation for transmitting different types of UCI. In such example, the resource allocation may be based on a combination of the different types of UCI.

For example, the resource allocation obtaining software 752 may be further configured for obtaining a plurality of DCI formats from the scheduling entity. In such example, each of the plurality of DCI formats may include a different amount of information for dynamic scheduling. For example, the resource allocation obtaining software 752 may be further configured for obtaining an indicator that identifies one of the plurality of DCI formats.

For example, the resource allocation obtaining software 752 may be further configured for obtaining a resource allocation for transmission of an ACK/NACK payload. In such example, the resource allocation may be obtained using an implicit mapping that identifies an uplink control channel resource based on at least one of a starting resource block index, a first shift index, or a time domain OCC. For example, the resource allocation obtaining software 752 may be further configured for obtaining control information from the scheduling entity on a control channel.

For example, the resource allocation obtaining software 752 may be further configured for obtaining a resource allocation for transmission of an ACK/NACK payload. In such example, the resource allocation may be obtained by mapping to one of a plurality of sequences for a sequence-based transmission of the ACK/NACK payload. This mapping may vary with time based on one or more parameters. In some aspects, the resource allocation obtaining software 752 may be configured to implement one or more of the functions described above in relation to FIGS. 12-18, including, e.g., blocks 1202, 1204, 1206, 1302, 1402, 1404, 1502, 1702, and/or 1804.

In one or more examples, the computer-readable storage medium 706 may include ACK/NACK payload transmitting software 754 configured for various functions, including, for example, transmitting the ACK/NACK payload based on the obtained resource allocation. For example, the ACK/NACK payload transmitting software 754 may be further configured for transmitting the different types of UCI based on the obtained resource allocation. For example, the ACK/NACK payload transmitting software 754 may be further configured for transmitting an ACK for the control information to the scheduling entity. In some aspects, the ACK/NACK payload transmitting software 754 may be configured to implement one or more of the functions described above in relation to FIGS. 12-18, including, e.g., blocks 1208, 1304, 1504, 1704, and/or 1806.

In one or more examples, the computer-readable storage medium 706 may include CSI report transmitting software 756 configured for implementing various functions. These functions can include, for example, transmitting the one or more CSI reports to the scheduling entity. For example, the CSI report transmitting software 756 may be configured to implement one or more of the functions described above in relation to FIG. 16, including, e.g., block 1604.

In one or more examples, the computer-readable storage medium 706 may include DCI receiving software 758 configured for various functions, including, for example, receiving DCI based on the identified one of the plurality of DCI formats. For example, the DCI receiving software 758 may be configured to implement one or more of the functions described above in relation to FIG. 14, including, e.g., block 1406.

The aspects described herein may enable a UE in a wireless network to obtain a resource allocation more efficiently and without increasing signaling overhead as compared to conventional techniques. The aspects described herein may further enable a UE to transmit uplink control information (UCI) to the wireless network more reliably than conventional techniques by reducing the likelihood of failed UCI transmissions that may result from interference or other factors.

A scheduled entity may transmit uplink control information (e.g., a one-bit ACK/NACK or a two-bit ACK/NACK) using a sequence-based PUCCH transmission. For example, the sequence-based PUCCH transmission may be implemented with a Zadoff-Chu sequence (known to those of ordinary skill in the art) or other suitable sequence. In one example, the scheduled entity may generate a base sequence (also referred to as a root sequence) and one or more cyclic shifted versions of the base sequence. In such example, for the case of a one-bit ACK/NACK, an ACK may be mapped to one sequence (e.g., the base sequence) and a NACK may be mapped to another sequence (e.g., a cyclic-shifted version of the base sequence). The scheduling entity may receive the sequence-based PUCCH transmission from the scheduled entity and may obtain the uplink control information (e.g., ACK or NACK). For example, the scheduling entity may identify the sequence in the sequence-based PUCCH transmission and may determine whether the sequence is mapped to an ACK or a NACK. The aspects of the disclosure described herein involve designs for ACK/NACK resource allocation (e.g., sequence selection and RB allocation) and frequency hopping configurations for PUCCH transmissions (e.g., ACK/NACK transmissions).

In some aspects of the disclosure, the scheduled entity may identify a PUCCH resource if the scheduled entity has obtained a PUCCH format, the starting symbol in a slot of a subframe, the slot(s) of a subframe in which the PUCCH may be transmitted, and the physical resource blocks allocation within the UL bandwidth part (BWP). The scheduled entity may need to obtain additional information to identify a PUCCH resource depending on the number of bits of UCI that it needs to transmit. A variety of sample scenarios are discussed below.

In a first example scenario, if the scheduled entity is to transmit one or two bits of UCI in a one-symbol short PUCCH resource, the scheduled entity may need to obtain the appropriate code/sequence index(es). Otherwise, if the scheduled entity is to transmit more than two bits of UCI in a one-symbol short PUCCH resource, the scheduled entity may not need to obtain any additional information.

In a second example scenario, if the scheduled entity is to transmit one or two bits of UCI in a two-symbol short PUCCH resource, the scheduled entity may need to obtain the appropriate code/sequence index(es) and a frequency hopping pattern. Otherwise, if the scheduled entity is to transmit more than two bits of UCI in a two-symbol short PUCCH resource, the scheduled entity may need to obtain a frequency hopping pattern.

In a third example scenario, if the scheduled entity is to transmit one or two bits of UCI in a long PUCCH resource, the scheduled entity may need to obtain the duration of the long PUCCH resource within a slot of a subframe (or within multiple slots of a subframe if the long PUCCH resource is configured in more than one slot), the appropriate sequence/code index (e.g., an OCC and a cyclic-shift), and a frequency-hopping pattern. Otherwise, if the scheduled entity is to transmit more than two bits of UCI in a long PUCCH resource, the scheduled entity may need to obtain the duration of the long PUCCH resource within a slot of a subframe (or within multiple slots of a subframe if the long PUCCH resource is configured in more than one slot) and a frequency-hopping pattern.

Resource Allocation Type

In various aspects of the disclosure, at least for HARQ-ACK transmission from the scheduled entity, a set of PUCCH resources may be configured utilizing explicit signaling, or via implicit resource mapping. For example, the scheduling entity may explicitly identify a set of PUCCH resources by high layer signaling, by DCI, or any other suitable explicit signaling. In another example, the scheduled entity may determine a set of PUCCH resources utilizing implicit resource mapping. A scheduled entity can determine (e.g., derive) the set of PUCCH resources from one or more parameters known to the scheduling entity. In some aspects, a long PUCCH region (also referred to as a long duration PUCCH) may have a variable number of symbols (in some examples, with a minimum of four symbols) in a given slot with a set of supported values. In some aspects, a scheduled entity may determine the time resource for a long-duration PUCCH in a slot based on an explicit and dynamic indication, a semi-static configuration, and/or an implicit determination, or combinations thereof. For example, when an explicit semi-static configuration is indicated to the scheduled entity, the scheduled entity may apply or use the semi-static configuration (e.g., a resource grant) until a subsequent explicit configuration is received. Therefore, such semi-static configurations may reduce the grant overhead in a network system.

In some aspects of the disclosure, a semi-static resource allocation may be supported for PUCCH. However, the resources may be reserved for a relatively long period of time. Therefore, a semi-static resource allocation may be efficient for a scheduling request (SR) where a certain resource may need to be reserved for scheduled entities to initiate a UL data transmission or periodic control information (e.g., periodic CQI). To reduce turnaround time for certain high priority scheduled entities, scheduled entities may be configured to transmit a buffer status report (BSR) with reduced payload on PUCCH in place of SR. For semi-persistent PDSCH, a semi-static resource allocation for the ACK channel may also reduce grant overhead. On the other hand, uplink control information (e.g., an ACK) for dynamic PDSCH may not have a predictable transmission pattern and therefore semi-static configurations may incur resource waste.

Resource allocations may come about via several approaches. In some aspects, to avoid such resource waste, resources for dynamic ACK transmission may be allocated to the scheduled entity using dynamic resource allocation. Therefore, in some aspects of the disclosure, the resource allocation type for PUCCH may depend on its uplink control information. In some aspects of the disclosure, resource allocation for PUCCH may depend on uplink control information. In some aspects of the disclosure, a scheduled entity may support semi-static resource allocation for periodic CQI, SR, and/or ACK/NACK for semi-persistent PDSCH. In some aspects of the disclosure, a scheduled entity may support dynamic resource allocation at least for ACK/NACK for dynamic PDSCH.

Mapping ACK/NACK to Sequences

In accordance with various aspects of the disclosure, the mapping of a one-bit ACK/NACK payload or a two-bit ACK/NACK payload to sequences (e.g., for a sequence-based PUCCH transmission) may vary with time based on one or more parameters. Such variation of the mapping may reduce (e.g., randomize) interference. In one aspect of the disclosure, the one or more parameters may include an initial/current slot and/or an OFDM symbol index. In another aspect of the disclosure, the one or more parameters may include an identifier of the scheduled entity (e.g., a UE identifier, such as a radio network temporary identifier (RNTI) or other ID configured for this purpose). In another aspect of the disclosure, the one or more parameters may include a retransmission attempt index or redundancy version (RV) identifier.

In some aspects of the disclosure, the mapping may be configurable. In one example, each sequence may be individually configurable. In another example, the sequences may be equally spaced cyclic-shifts of a common base sequence. The shift spacing and/or the minimum/first shift may be configurable. The previously described configurations may be implicit or explicit.

In some aspects of the disclosure, different sequences may be configured with different power offsets (e.g., similar to PUCCH-format based offset in PUCCH power control). For example, the power of a NACK transmission may need to be greater than the power of an ACK transmission. In such example, a NACK may be mapped to a first sequence and an ACK may be mapped to a second sequence, where the transmission power configured for the first sequence is greater than the transmission power configured for the second sequence.

Inputs for Implicit Mapping Function

A scheduled entity may use an implicit mapping function (also referred to as an implicit mapping rule) to obtain a resource allocation for a PUCCH transmission (e.g., ACK/NACK). In one aspect of the disclosure, an input for the implicit mapping function may include resource allocation parameters of the PDCCH resource that triggers UCI. For example, such resource allocation parameters may include the control channel element (CCE) index within a CORE-SET. The resource allocation parameters may further include the CORESET and bandwidth part index. In other examples, the resource allocation parameters may further include an RNTI used to scramble the PDCCH.

In another aspect of the disclosure, an input for the implicit mapping function may include the PDCCH payload contents conveying other information. For example, the PDCCH payload contents may include the details of a scheduled PDSCH resource (e.g., a resource block (RB) allocation, such as the first RB index or the minimum RB index), rank, modulation and coding scheme (MCS), waveform, and/or other suitable items of information. For example, the PDCCH payload contents may include details of a PDCCH order (e.g., semi-persistent scheduling (SPS) release vs. beam-switch indicator).

In another aspect of the disclosure, an input for the implicit mapping function may include the contents of the scheduled PDSCH. This may apply for on-off type of ACK/NACK signaling, such as for the ACK ending the contention-resolution in a random access channel (RACH) procedure (e.g., ACK for message 4 (Msg4) in a 4-step RACH procedure).

Obtaining a Resource Allocation for Transmitting an ACK/NACK Using an Implicit Mapping Function For transmission of one or two bits of ACK channels (e.g., a transmission in either a long PUCCH duration or a short PUCCH duration), a scheduled entity may derive an ACK resource using implicit mapping. In one aspect of the disclosure, the scheduled entity may apply an implicit mapping function in which a starting control channel element (CCE) of PDCCH is mapped to a particular ACK resource. Accordingly, the scheduled entity may determine the starting CCE of the PDCCH and identify the ACK resource. For example, the scheduled entity may determine a PUCCH resource (e.g., an ACK resource) with index $r_{PUCCH}$, (e.g., where $0 \leq r_{PUCCH} \leq 15$) using equation (1):

$$r_{PUCCH} = \left\lfloor \frac{2 \cdot n_{CCE,0}}{N_{CCE,0}} \right\rfloor + 2 \cdot \Delta_{PRI} \qquad \text{(equation 1)}$$

where $N_{CCE,0}$ represents a number of CCEs in a CORESET of a PDCCH reception conveying a DCI format (e.g., DCI format 1_0), $n_{CCE,0}$ represents the index of a first CCE for the PDCCH reception, and $\Delta_{PRI}$ represents a value (e.g., a 3 bit value) of the PUCCH resource indicator field included in the DCI (e.g., in DCI format 1_0 or DCI format 1_1).

In some aspects of the disclosure, PUCCH resources may be grouped into resource pools. The scheduled entity may select a resource pool based on the PUCCH payload. In some example implementations, within each resource pool, there may be up to 16 PUCCH resources that are indexed in sequence. The PUCCH resource allocation may include an indication of an index (e.g., $r_{PUCCH}$) corresponding to one of the 16 PUCCH resources. Three bits of this index may be explicitly indicated to the scheduled entity in a DL DCI grant as $\Delta_{PRI}$ in equation 1. The scheduled entity may determine the remaining bit (e.g., the fourth bit representing the least significant bit) of the index based on the expression $$\left\lfloor \frac{2 \cdot n_{CCE,0}}{N_{CCE,0}} \right\rfloor.$$

It should be noted that since $n_{CCE,0}$ may be at most $N_{CCE,0}-1$, the result of the expression $$\left\lfloor \frac{2 \cdot n_{CCE,0}}{N_{CCE,0}} \right\rfloor$$

may be either 0 or 1. Therefore, it should be noted that the index $r_{PUCCH}$ may not be explicitly provided to the scheduled entity. After the scheduled entity has determined the index $r_{PUCCH}$, the scheduled entity may identify an ACK resource that is mapped to the index $r_{PUCCH}$.

In some aspects of the disclosure, if the network is implementing multiple CORESETs, the scheduled entity may apply a resource mapping function that depends on a starting control channel element (CCE) index and a unique CORESET offset. The unique CORESET offset may prevent ACK resource collisions in scenarios where multiple scheduled entities have the same starting CCE index. For example, the CORESET offset may ensure that scheduled entities monitoring different CORESETs map to different ACK resource pools.

In some aspects of the disclosure, ACK resource collisions may be avoided by including a unique identifier of a scheduled entity (also referred to a UE ID) as an input of the implicit mapping function. For example, the unique identifier of the scheduled entity may be the $n_{SCID}$ associated with the downlink MU-MIMO transmission. The $n_{SCID}$ may be a scrambling identifier assigned to the scheduled entity. For example, adding a unique offset based on $n_{SCID}$ on top of the existing implicit mapping rule may avoid ACK resource collisions. Different scheduled entities in the MU-MIMO mode may then be mapped to different resource pools.

Therefore, in some aspects of the disclosure, a scheduled entity may support at least implicit resource mapping from a starting CCE index of the PDCCH to ACK resources for one or two bits in both a long PUCCH duration and a short PUCCH duration. In some aspects of the disclosure, the scheduled entity may receive an acknowledgement resource indicator (ARI) (e.g., in DCI) that indicates the unique CORESET offset. In some aspects of the disclosure, the scheduled entity may receive an ARI (e.g., in DCI) that indicates the $n_{SCID}$. In some aspects of the disclosure, the scheduling entity may transmit an ARI (e.g., in DCI) to indicate different CORESETs or different $n_{SCID}$ values to different scheduled entities.

In some aspects of the disclosure, when the scheduled entity has determined which ACK resource pool it should use, it may proceed to determine the ACK resource index within the resource pool. The scheduled entity may make this determination using a combination of implicit mapping and explicit indication. For a one or two bit ACK channel, since a long PUCCH-ACK and a short PUCCH-ACK have different channel structures as well as different operation signal-to-noise ratios (SNRs), the short PUCCH-ACK and long PUCCH-ACK resources may be orthogonal to each other. Therefore, they may be mapped to different PDCCH starting CCEs. Otherwise, the one PDCCH CCE may only be used to schedule either a long PUCCH-ACK or a short PUCCH-ACK, but not both. This may lead to an under-utilization of uplink ACK resources. For example, mapping different PDCCH CCEs to long and short PUCCH-ACKs may overcome this issue.

Figure 8A:
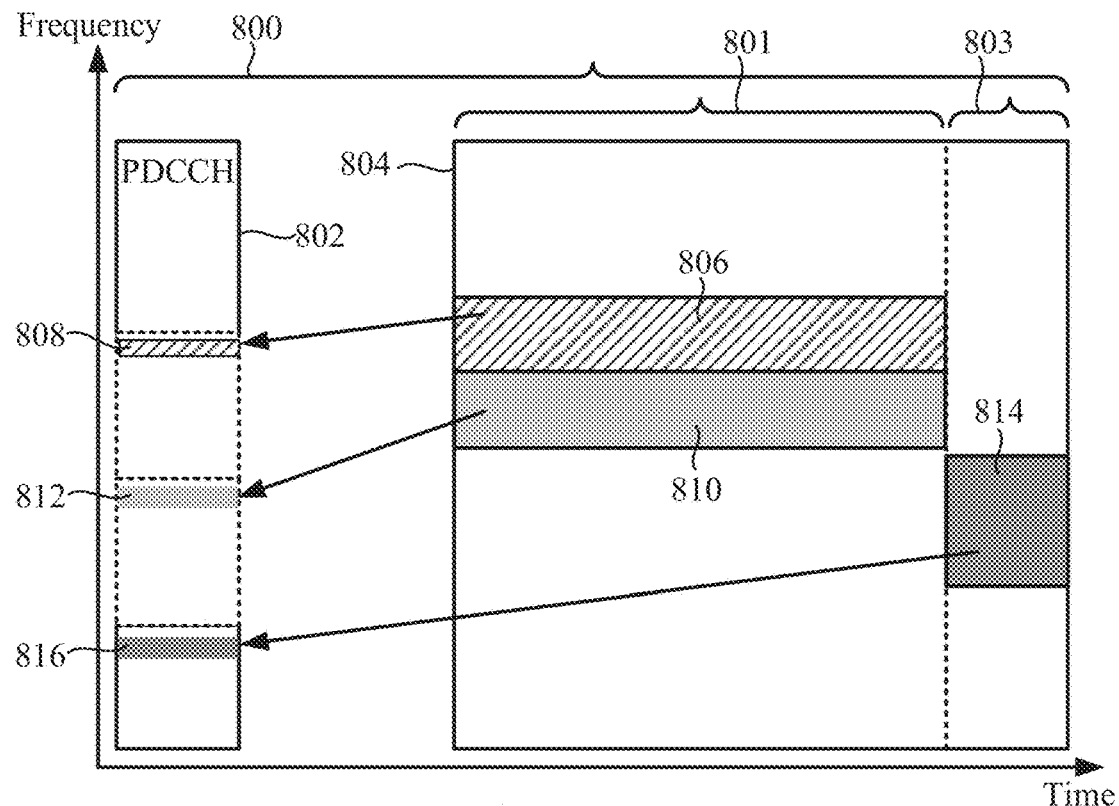
FIG. 8 (including FIGS. 8A and 8B) illustrates an example mapping of a starting resource block (RB) index from a PDCCH CCE index according to some embodiments.
Figure 8B:
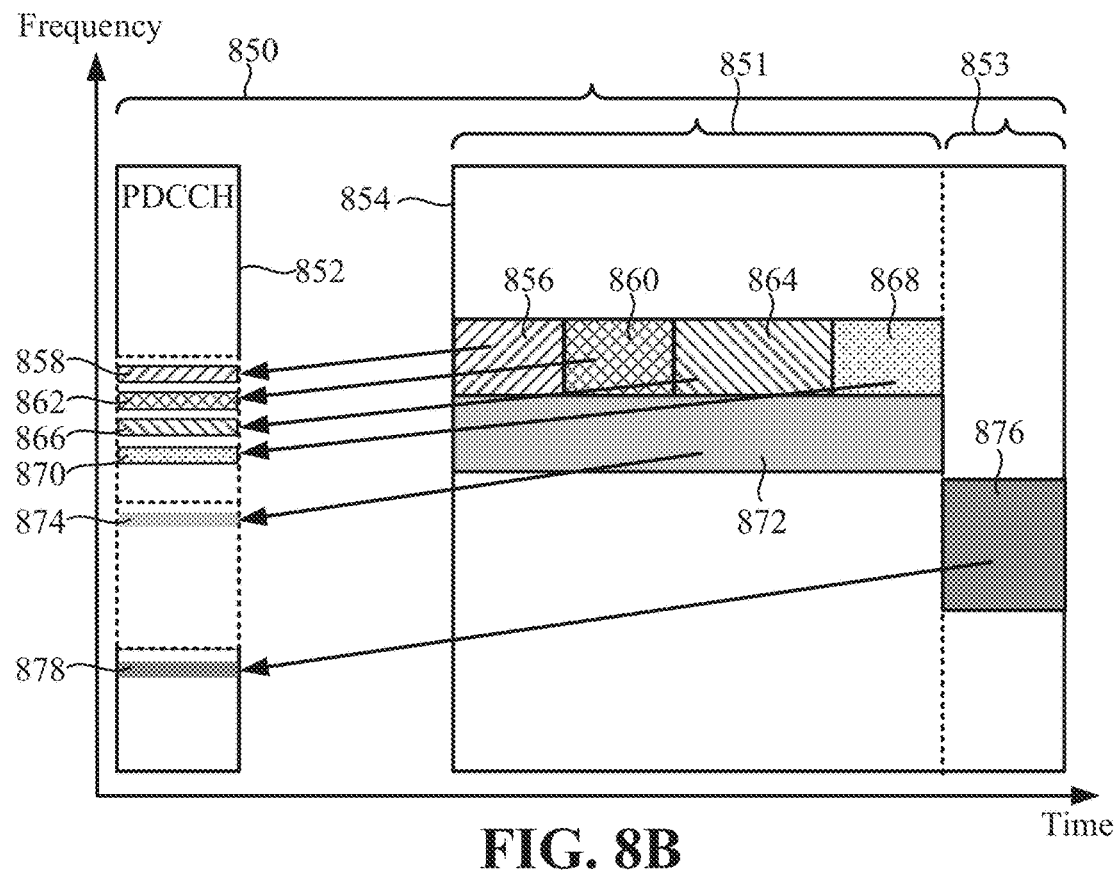

FIG. 8 (including FIGS. 8A and 8B) illustrates an example of how the starting resource block (RB) index may be mapped from a PDCCH CCE index. FIG. 8A shows an exemplary subframe 800 and a mapping between a PDCCH 802 and PUCCHs in an uplink region 804. As shown in FIG. 8A, the uplink region 804 includes a long duration region 801 and a short duration region 803. As further shown in FIG. 8A, the long PUCCH duration 806 (also referred to as long PUCCH duration resources 806) may be mapped from resources 808 of the PDCCH 802, the long PUCCH duration 810 (also referred to as long PUCCH duration resources 810) may be mapped from resources 812 of the PDCCH 802, and the short PUCCH duration 814 (also referred to as short PUCCH duration resources 814) may be mapped from resources 816 of the PDCCH 802. A long PUCCH duration in the uplink region 804 may be the same as a cell-specific long duration. Cell-specific long and short durations are described in detail herein.

FIG. 8B shows an exemplary subframe 850 and a mapping between a PDCCH 852 and PUCCHs in an uplink region 854. As shown in FIG. 8B, the uplink region 854 includes a long duration region 851 and a short duration region 853. In some aspects of the disclosure, and as shown in FIG. 8B, the long PUCCH-ACK channels (e.g., the resources in the long duration region 851) may be time division multiplexed (e.g., shown in FIG. 8B as time division multiplexed PUCCH resources 856, 860, 864, 868). In the example configuration of FIG. 8B, PUCCH resources 856 may be mapped from resources 858 of the PDCCH 852, PUCCH resources 860 may be mapped from resources 862 of the PDCCH 852, PUCCH resources 864 may be mapped from resources 866 of the PDCCH 852, PUCCH resources 868 may be mapped from resources 870 of the PDCCH 852, PUCCH resources 872 may be mapped from resources 874 of the PDCCH 852, and PUCCH resources 876 may be mapped from resources 878 of the PDCCH 852. Since a TDD system has uplink/downlink reciprocity, with shorter long PUCCH-ACK durations (e.g., as in the PUCCH resources 856, 860, 864, and/or 868), the corresponding aggregation level of PDCCHs may also be smaller. In some aspects, the scheduling entity may ensure that no two PUCCH-ACK channels time division multiplexed in the same resource block will be mapped to the same PDCCH CCE index.

The resources for long and short ACK transmissions may be semi-statically configured in SIBs. The base sequence index for a PUCCH-ACK may be either semi-statically configured in the SIBs or pre-determined based on a cell ID. In some aspects of the disclosure, for a long PUCCH-ACK, the number of RBs may be fixed to one RB. In some aspects of the disclosure, for a short PUCCH-ACK, one, two, or four RBs may be supported. In some aspects of the disclosure, the number of RBs may depend on the channel conditions of the scheduled entity (e.g., cell edge or cell centre). To save overhead, the number of RBs may be semi-statically configured via an RRC configuration. A dynamic scheduling of a number of RBs may override this default value.

In some aspects of the disclosure, the processing time(s) of the scheduled entity may be defined in terms of a number of OFDM symbols (e.g., N1, N2) together with absolute time (e.g., in microseconds (μs)), instead of slots (K). For example, N1 may represent the number of OFDM symbols required for the scheduled entity to process from the end of NR-PDSCH reception to the earliest possible start of the corresponding ACK/NACK transmission from the perspective of the scheduled entity. Therefore, a slot index and a starting symbol index may be derived from the value N1. In some aspects of the disclosure, the scheduled entity processing time(s) (previously defined as the value K1) may have a default value, which may be dynamically overridden. In some aspects of the disclosure, a semi-static N1 value may have a wider range than dynamic N1 values to concurrently reduce DCI overhead and support a wide range of N1 values. In some aspects of the disclosure, a dynamic N1 value may be derived from an offset value with respect to the semi-static N1 value to save signalling overhead. The set of allowable offset values may be signalled to the scheduled entity via an RRC configuration. The assigned offset value may be signalled to the scheduled entity in DCI. Therefore, the scheduled entity may determine the dynamic N1 value by summing the semi-static N1 value and an indicated dynamic offset value.

In some aspects of the disclosure, a duration of a short PUCCH may be either one or two symbols, which may be either dynamically or semi-statically configured. For a short PUCCH-ACK channel, using one or two symbols may depend on the channel conditions of the scheduled entity. As such, the duration of short PUCCH-ACK may be semi-statically configured via an RRC configuration. A dynamic scheduling of the number of symbols may override this default value.

In some aspects of the disclosure, the scheduled entity may derive the duration of long PUCCH in default mode. In the default mode, an ending symbol of the long PUCCH may be determined by the starting position of a short uplink duration. The starting position of the short uplink duration may be semi-statically configured. In some aspects of the disclosure, a PUCCH-ACK may span more than one slot for coverage enhancement. The number of slots may depend on the link budget of the scheduled entity. As such, this information may be semi-statically configured via an RRC configuration. The duration of a long PUCCH may be dynamically configured in DCI. In a first example scenario, when an ending symbol exceeds the slot boundary of a starting symbol, consecutive symbols between the starting symbol and the ending symbol may be assigned to scheduled entities. In a second example scenario, when the ending symbol is within the slot boundary of the starting symbol, and the number of slots is greater than one, the same starting and ending symbols per slot may be used within the assigned multi-slots.

Figure 9A:
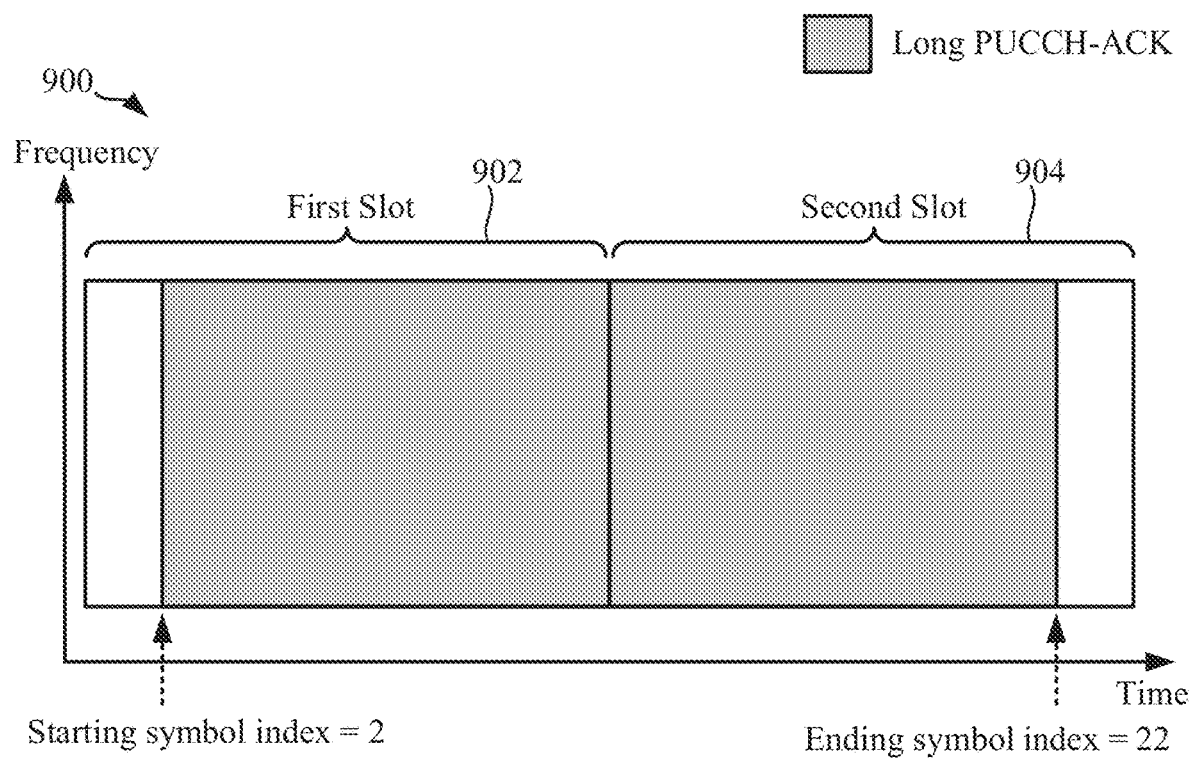
FIG. 9 (including FIGS. 9A and 9B) illustrates first and second example scenarios for a long PUCCH-ACK with aggregated slots according to some embodiments.
Figure 9B:
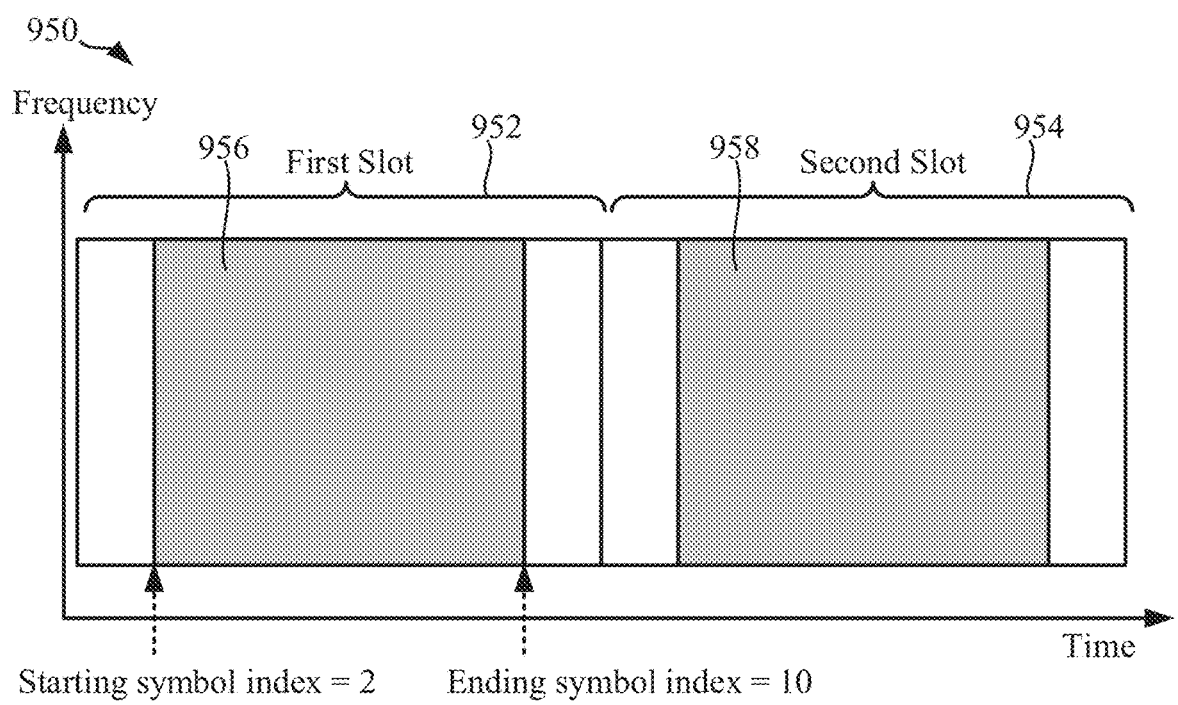

FIG. 9 (including FIGS. 9A and 9B) illustrates the previously described first and second example scenarios for a long PUCCH-ACK with aggregated slots. In both cases, the scheduled entity may be assigned two slots (e.g., a first slot and a second slot). FIG. 9A shows a subframe 900 in which a starting symbol and an ending symbol are in different slots. For example, as shown in FIG. 9A, the starting symbol (e.g., having an index value 2) may be in the first slot 902 and the ending symbol (e.g., having an index value 22) may be in the second slot 904. Therefore, all symbols between the starting and ending symbols in FIG. 9A may be used for the long PUCCH-ACK of the scheduled entity.

FIG. 9B shows a subframe 950 in which a starting symbol and an ending symbol are in the same slot. For example, as shown in FIG. 9B, the starting symbol (e.g., having an index value 2) may be in the first slot 952 and the ending symbol (e.g., having an index value 10) may also be in the first slot 952. The second slot 954 may be configured similar to the first slot 952. Therefore, as shown in FIG. 9B, the scheduled entity's long PUCCH-ACK duration (e.g., portions 956 and 958) may not be continuous. In the two slots, however, the scheduled entity may use the same starting and ending symbols so that the symbol indices in the ensuing slots do not need to be signalled. For flexibility, the scheduling entity may also provide a dynamic configuration of the number of slots and number of RBs to the scheduled entity.

To limit the signaling overhead for a multi-slot PUCCH resource, an indication of the start and end OFDM symbols may be provided together with an indication of the slots they apply to and the number of slots in the assignment. When the start and the end OFDM symbols are in different slots, the multi-slot resource is contiguous in time from the start OFDM symbol to the end OFDM symbol. When the start and end OFDM symbols are in the same slot, the resource may be non-contiguous in time, with the start and end slot applying to each slot in the multi-slot assignment.

Frequency Hopping

A scheduled entity can transmit PUCCH (also referred to as NR PUCCH) at least two different ways. In one example, PUCCH may have a short duration (e.g., one or two UL OFDM symbols in a slot). In such example, the scheduled entity may transmit PUCCH at or near the end of the slot. The PUCCH can either be time division multiplexed or frequency division multiplexed with the UL data channel (e.g., PUSCH) within the same slot. In another example, the PUCCH may have a long duration (e.g., multiple UL OFDM symbols), in which case the scheduled entity may transmit PUCCH at or near the end of the slot. In this example, the PUCCH is frequency division multiplexed with the UL data channel (e.g., PUSCH, which is also referred to as NR PUSCH) within the same slot.

In some aspects of the disclosure, for a long PUCCH-ACK, a frequency hopping function of the scheduled entity may be enabled or disabled via an RRC configuration. Frequency hopping may also be enabled or disabled for a short PUCCH with two symbols. To balance between DCI overhead and scheduling flexibility, two DCI formats with different payload lengths may be defined. In some aspects, the DCI may have a fixed payload (also referred to as a fallback DCI) or a configurable payload (also referred to as a full DCI). In some aspects, a short DCI format A0 may include minimum dynamic scheduling information for a short PUCCH-ACK. In some aspects, a long DCI format A1 may include more dynamic scheduling information for the short PUCCH-ACK. An indicator (e.g., an integer value) may be set semi-statically in RRC to indicate which format a scheduled entity should decode. Alternatively, the indicator may also indicate whether the scheduled entity should perform blind detection of different DCI formats. For example, an integer value 0 may indicate a default DCI format A0, in which case the scheduled entity may not need to perform blind detection. As another example, an integer value 1 may indicate that the scheduled entity may need to perform blind detection of both DCI formats.

Examples as to the types of information that may be semi-statically or dynamically configured at a scheduled entity are described herein. In cases where information is dynamically configured, the examples cover situations where the dynamic configuration is by explicit indication or implicit mapping. In a first example, for one or two bits of ACK channel, at least the following information may be semi-statically configured in SIBs: resource pools for different groups (e.g., CORESETs, MU-MIMO, etc.); long and short PUCCH-ACK resource regions within each pool; and a base sequence index (if not pre-determined).

In a second example, the following information may be semi-statically configured via an RRC configuration: a default N1 value; the set of N1 values for dynamic indication; a number of RB indexes for a short PUCCH-ACK if two RBs or four RBs are supported; a number of symbols for a short PUCCH-ACK; a number of slots for a long-PUCCH ACK; a frequency hopping indicator for either a short PUCCH-ACK or a long PUCCH-ACK; and a DCI format indication to inform the scheduled entity as to which DCI format to expect (e.g., DCI format A0, DCI format A1).

For example, the DCI format A0 may indicate a dynamic N1 value (reserve one value to indicate using a default N1 value) and an acknowledgement resource indicator (ARI) for different UL PUCCH-ACK resource pools. For example, a scheduled entity may derive a starting symbol and slot index from the N1 value and may derive an ending symbol of a long PUCCH based on the boundary between a long PUCCH duration and a short PUCCH duration. The bit width of the field carrying the dynamic N1 value (e.g., a rank value) may be determined by the set of dynamic N1 values. If the set of dynamic N1 values includes one value (or no values), this field may not exist. For example, the bit width of the field carrying the ARI for different UL PUCCH-ACK resource pools may be determined by the number of UL PUCCH-ACK resource pools in the system.

For example, the DCI format A1 may indicate a dynamic N1 value (reserve one value to indicate using a default N1 value), an ending symbol or the number of symbols for either a short PUCCH or a long PUCCH, a number of RBs for a short PUCCH, and a number of slots for a long PUCCH. For example, the scheduled entity may derive a starting symbol and a slot index from the N1 value. The bit width of the field carrying the dynamic N1 value may be determined by the set of dynamic N1 values. If the set of dynamic N1 values includes one value (or no values), this field may not exist. The number of RBs for a short PUCCH may override a default value of an RRC configuration. The number of slots for a long PUCCH may override a default value of an RRC configuration.

In some aspects of the disclosure, a scheduled entity may use implicit mapping to determine one or more parameters. The one or more parameters may enable the scheduled entity to identify UL resources for transmitting control information to the network. For example, the one or more parameters may include a long PUCCH region in a subframe or a short PUCCH region in a subframe.

For example, the one or more parameters may further include a starting RB index. In some aspects of the disclosure, the starting RB index may be the starting RB index in the first hop if frequency hopping is enabled. The starting RB index for the second hop may be derived based on this starting RB index in the first hop. In some aspects of the disclosure, the RB allocation for a second hop may be a function of that of the first hop and possibly other parameters, such as a slot index. In some aspects of the disclosure, an implicit mapping rule may apply to only the first hop. In some aspects of the disclosure, the implicit mapping function may take the number of RBs into account if two RBs or four RBs are supported.

For example, the one or more parameters may further include a first shift index. In some aspects of the disclosure, for a long PUCCH-ACK channel, the first shift index may be the first shift index in the first symbol. The remaining shift indices may be derived based on a pre-determined shift hopping pattern. For a short PUCCH-ACK, this means the first shift index for a sequence based short ACK. In some aspects of the disclosure, $N_s$ may represent a sequence length, and $N_b$ may represent the number of ACK bits. Therefore, in one example, the first shift index $S_0$ may be in the range of $$\left[0, \frac{N_s}{2^{N_b}} - 1\right].$$

The scheduled entity may derive the remaining shift indices in the first symbol based on the first shift distance $$d_s = \frac{N_s}{2^{N_b}}.$$

Therefore, the shift index $S_i$ for the $i^{th}$ hypothesis may be determined from equation 2:

$$S_i = S_0 + i*d_s, i=1, \ldots, 2^{N_b}-1. \qquad \text{(equation 2)}$$

The scheduled entity may determine the shift indices for the second symbol based on pre-determined shift hopping rules if the PUCCH is a two-symbol short PUCCH.

For example, the one or more parameters may further include a time domain OCC index for a long PUCCH. In some aspects of the disclosure, for a long PUCCH, the scheduled entity may determine the spreading factor and the corresponding OCC sets based on the number of data and DMRS symbols in the slot and whether frequency hopping is enabled. The time domain OCC index indicates the OCC index within the previously described OCC sets.

Figure 10:
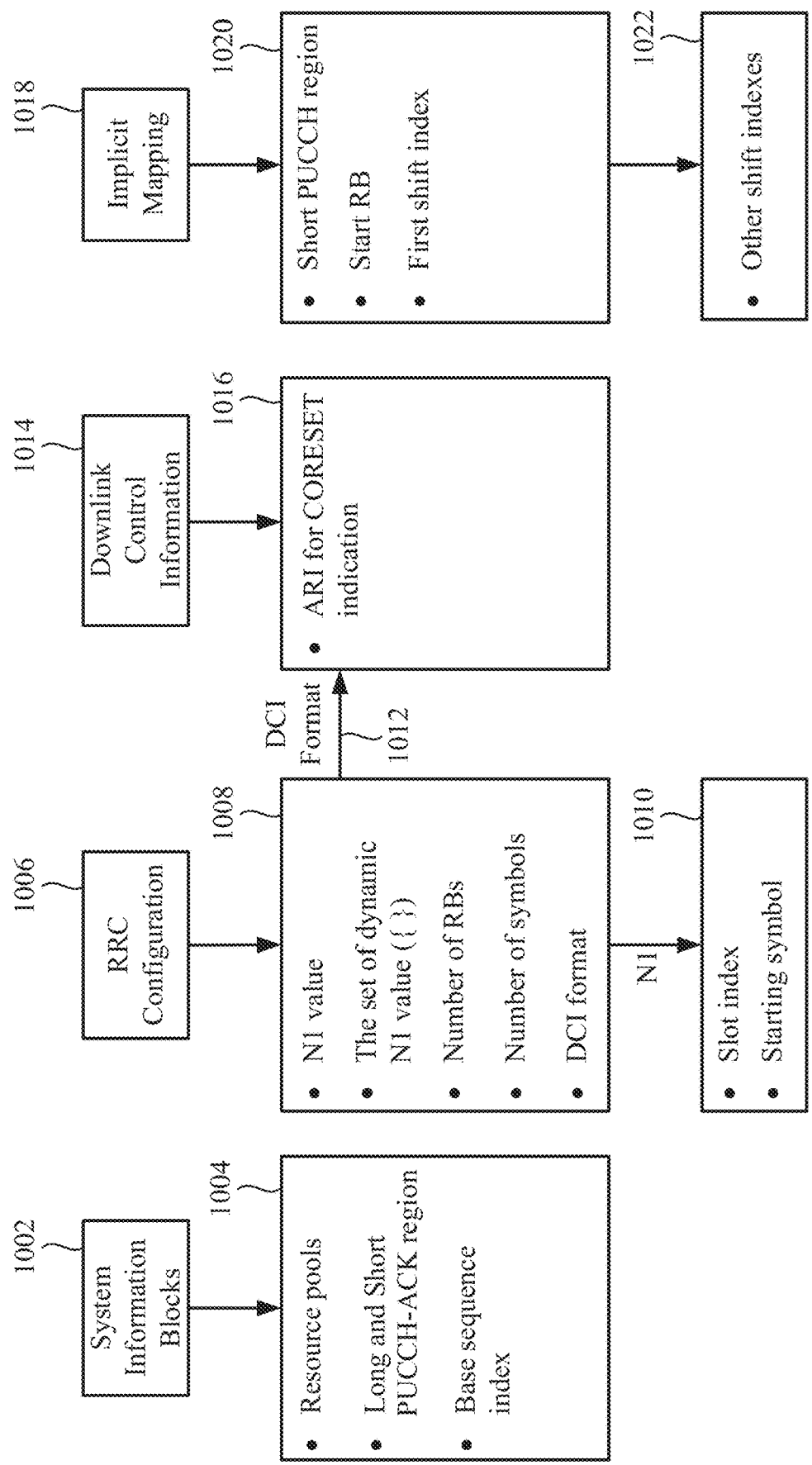
FIG. 10 shows an example approach for a scheduled entity to determine ACK resource information for a specific one-symbol short PUCCH-ACK channel with two bits of ACK and DCI format A0 according to some embodiments.

FIG. 10 shows an example approach for a scheduled entity to determine ACK resource information for a specific one-symbol short PUCCH-ACK channel with two bits of ACK and DCI format A0. With reference to FIG. 10, a scheduled entity may obtain one or more system information blocks (SIBs) 1002 including information 1004. For example, information 1004 may include resource pools (e.g., an indication of a total number of CORESETS, such as four CORESETS), an indication of a long PUCCH-ACK region in a subframe and a short PUCCH-ACK region in a subframe, and a base sequence index (e.g., 20). A scheduled entity may further obtain an RRC configuration 1006 including information 1008. For example, the information 1008 may include an N1 value (e.g., 12), a set of dynamic N1 values, a number of resource blocks (RBs) (e.g., 1), a number of symbols (e.g., 1), and a DCI format (e.g., DCI format A0). As shown in FIG. 10, the scheduled entity may derive information 1010 including a slot index and a starting symbol from the N1 value. The scheduled entity may obtain an indication of a DCI format 1012, which may be used to decode the DCI 1014. The DCI 1014 may include information 1016 including an acknowledgment resource indicator (ARI) that identifies a CORESET (e.g., the second CORESSET among the four CORESETS) of the scheduled entity. The scheduled entity may perform implicit mapping 1018 to derive information 1020. In this example, information 1020 may include a short PUCCH region, a starting resource block (RB) (e.g., RB 5), and a first shift index (e.g., 2). In some aspects, the scheduled entity may derive other shift indexes 1022 (e.g., 5, 8, 11) using impact mapping.

In some aspects of the disclosure, at least two DCI formats may be defined with different amounts of information for dynamic scheduling. In some aspects of the disclosure, an indicator of an RRC configuration may be used to indicate which format to be used for the scheduled entity. In some aspects of the disclosure, the following information may be based on implicit mapping (also referred to as implicit resource mapping) for PUCCH with one or two bits of ACK bits: a long or short PUCCH region, a starting RB index, a first shift index, and a time domain OCC index for a long PUCCH.

In some aspects of the disclosure, the scheduled entity may derive the number of ACK bits to be transmitted based on a number of code words per PDSCH and the number of PDSCHs to be acknowledged within a PUCCH channel. The number of PDSCHs to be acknowledged may depend on the number of component carriers (CCs) used. For example, if one PDSCH has one code word, the scheduled entity may transmit two ACK bits with two CCs. Since PDSCHs of different slots may be acknowledged within a single PUCCH channel, the number of PDSCHs may also depend on the total slots to be grouped in a single PUCCH channel. For example, if one PDSCH has one code word, the scheduled entity may transmit two ACK bits if it needs to acknowledge PDSCH from the current slot and its preceding slot concurrently.

If the scheduled entity does not successfully decode one PDCCH for PDSCH scheduling, the scheduled entity may transmit less ACK bits than what the scheduling entity expects. To avoid confusion between the scheduled entity and the scheduling entity in this regard, the scheduling entity may semi-statically configure the number of ACK bits for the scheduled entity for up to two ACK bits. For example, the scheduling entity may configure the scheduled entity to transmit two ACK bits only for two code words are in a single PDSCH. In such a case, if one PDSCH has only one code word, the scheduled entity may bundle the two ACK bits from two CCs to a single bit and then transmit for up to two CCs. The scheduled entity may transmit three or more ACK bits without bundling for three or more CCs. Similarly, the scheduled entity may bundle two PDSCHs from two different slots to a single ACK bit. The scheduled entity may transmit three or more ACK bits without bundling for three or more PDSCHs. In some aspects of the disclosure, the scheduling entity may semi-statically configure one or two ACK bits for one scheduled entity.

Resource Allocations for Combination of Uplink Control Information (UCI)

When different types of UCI are transmitted simultaneously, resource allocation for PUCCH may also be of different types depending on the combinations of the different type of UCI. For example, if one or two bits of ACK is to be transmitted together with a periodic CQI in a long PUCCH duration, the PUCCH may use a CQI resource with an ACK piggy backed on the CQI resource. In this case, dynamic allocation of the resource for an ACK may not be needed for a dynamic ACK/NACK. If the ACK/NACK transmission is for a semi-static PDSCH, the semi-static ACK resource for this slot may be freed for other scheduled entities.

If a larger payload of ACK bits is needed, the CQI resource may not be sufficient to transmit the combined UCI. In such cases, a new resource may be dynamically allocated, where the new resource overrides any semi-static resource allocation. The CQI resource or the ACK resource (if semi-persistent) may then be freed for other scheduled entities for this slot. In one aspect of the disclosure, the new resource may include completely new RBs (e.g., RBs different from either a CQI resource or an ACK resource previously allocated in a semi-static manner). In one aspect, the new resource may include either an extended CQI resource or an extended ACK resource. For example, the extended CQI resource or the extended ACK resource may include additional RBs. Since ACK and CQI resources have different performance targets, an independent coding scheme may be implemented. This may be achieved with a long-PUCCH+a long-PUCCH in a TDM manner, or a long-PUCCH+a short-PUCCH in a TDM manner, or a short-PUCCH+a short-PUCCH in a TDM manner. In some cases, ACK and CQI resources may also be frequency division multiplexed in an uplink short burst within one OFDM symbol.

In some aspects of the disclosure, resources may be allocated to a scheduled entity for combined UCI. For example, for one or two-bit ACK/NACK bits, a CQI resource may be allocated to the scheduled entity with an ACK piggy backed on the CQI resource. As another example, for more payload ACK bits, resources may be dynamically allocated to a scheduled entity with different multiplexing options. For example, two NR-PUCCHs may be multiplexed in a TDM manner with a long-PUCCH+a long-PUCCH, a long-PUCCH+a short-PUCCH, or a short-PUCCH+a short-PUCCH. For example, two NR-PUCCHs may be multiplexed in an FDM manner in a short burst with one OFDM symbol. In some aspects of the disclosure, a one-bit SR may be included with a multi-bit ACK transmission when the number of ACK bits is greater than a threshold. In some aspects of the disclosure, an SR may be included with other types of UCI.

Cell-Specific Long and Short PUCCH Durations

It should be noted that a cell-specific long duration may be distinguished from a scheduled entity specific long duration. A cell-specific short duration may be distinguished from a scheduled entity specific short duration. It should also be noted that a cell-specific uplink short burst (ULSB) may be distinguished from a scheduled entity specific ULSB. A dynamic configuration of ULSB may need an indication in the PDCCH and a scheduled entity may need to constantly decode the PDCCH in order to know where to transmit PUCCH in a ULSB. This may be undesirable when semi-static configuration or implicit mapping of a PUCCH resource is used. Therefore, in some aspects of the disclosure, a semi-static configuration of a ULSB duration may be used. Furthermore, the cell-specific short duration may need to be semi-statically configured so that the neighbouring cells may be configured with the same cell-specific short duration in the same slots in order to avoid mixed interference. The cell-specific long duration may be determined using equation (3):

CSLD=slot duration−semi-static cell specific short duration−semi-static PDCCH duration−GAP   (equation 3)

where the term CSLD represents the cell-specific long duration and the term GAP represents a guard period. The scheduled entity specific short duration may be a subset of the cell specific short duration. For example, the cell-specific short duration may be two symbols and the scheduled entity specific short duration may be one symbol. In some aspects, the scheduled entity specific short duration may not exceed the cell-specific short duration in order to avoid mixed interference. The scheduled entity specific long duration may also be a subset of the cell specific long duration. For example, the cell-specific long duration may be 11 symbols and scheduled entity specific long duration may be four symbols. The scheduling entity may control the scheduled entity-specific long duration by assigning a start/end symbol index.

Extension of the scheduled entity specific long duration for exceeding the cell-specific long duration will now be described. The UL long PUCCH duration in a subframe may be affected by both a PDCCH region and a ULSB region. A default value of the PDCCH duration may be semi-statically configured by the scheduling entity, but the actual value of the PDCCH duration may be dynamically changed with any value that is less than the default. The actual PDCCH duration is indicated with a physical control format indicator channel (PCIFICH). However, a scheduled entity may not be required to decode the PCIFICH. Therefore, the starting position of the UL long PUCCH duration may be interpreted differently for scheduled entities with or without decoding the PCIFICH. This may complicate resource management for the scheduling entity. Since there may be time domain spreading, if the scheduled entities with different starting positions are multiplexed in the same RB, orthogonality may be broken due to different spreading factors that might be used at the scheduled entity side. Therefore, a scheduling entity may need to separate a first set of scheduled entities that decode PCIFICH from a second set of scheduled entities that do not decode PCIFICH and assign the first and second sets of scheduled entities to different RBs.

In some aspects of the disclosure, a scheduling entity may receive feedback from scheduled entities as to their PCIFICH decoding behavior. This feedback may enable the previously described separation of the first and second sets of scheduled entities. This feedback may further enable decoding of the PUCCH from scheduled entities with different long PUCCH durations. Such use of feedback from scheduled entities, however, may add some overhead. In some aspects of the disclosure, a PCIFICH decoding failure may lead to a PUCCH decoding failure due to an assumption of an incorrect starting position at a scheduled entity and at the scheduling entity. Alternatively, the starting position of a PUCCH may be semi-statically configured. This is possible because for any scheduled entity, regardless of whether it will decode PCIFICH, the PUCCH may always start from the default position in some aspects of the disclosure. The PUCCH transmission may not extend to a default PDCCH+GAP region even though the actual number of PDCCH symbols is less. In one approach, a scheduled entity specific long duration may be constrained so as to prevent extension into a PDCCH+GAP region, which may substantially simplify matters for both the scheduling entity and the scheduled entity. This approach, however, may result in a waste of PUCCH RBs in an unused PDCCH region.

Figure 11:
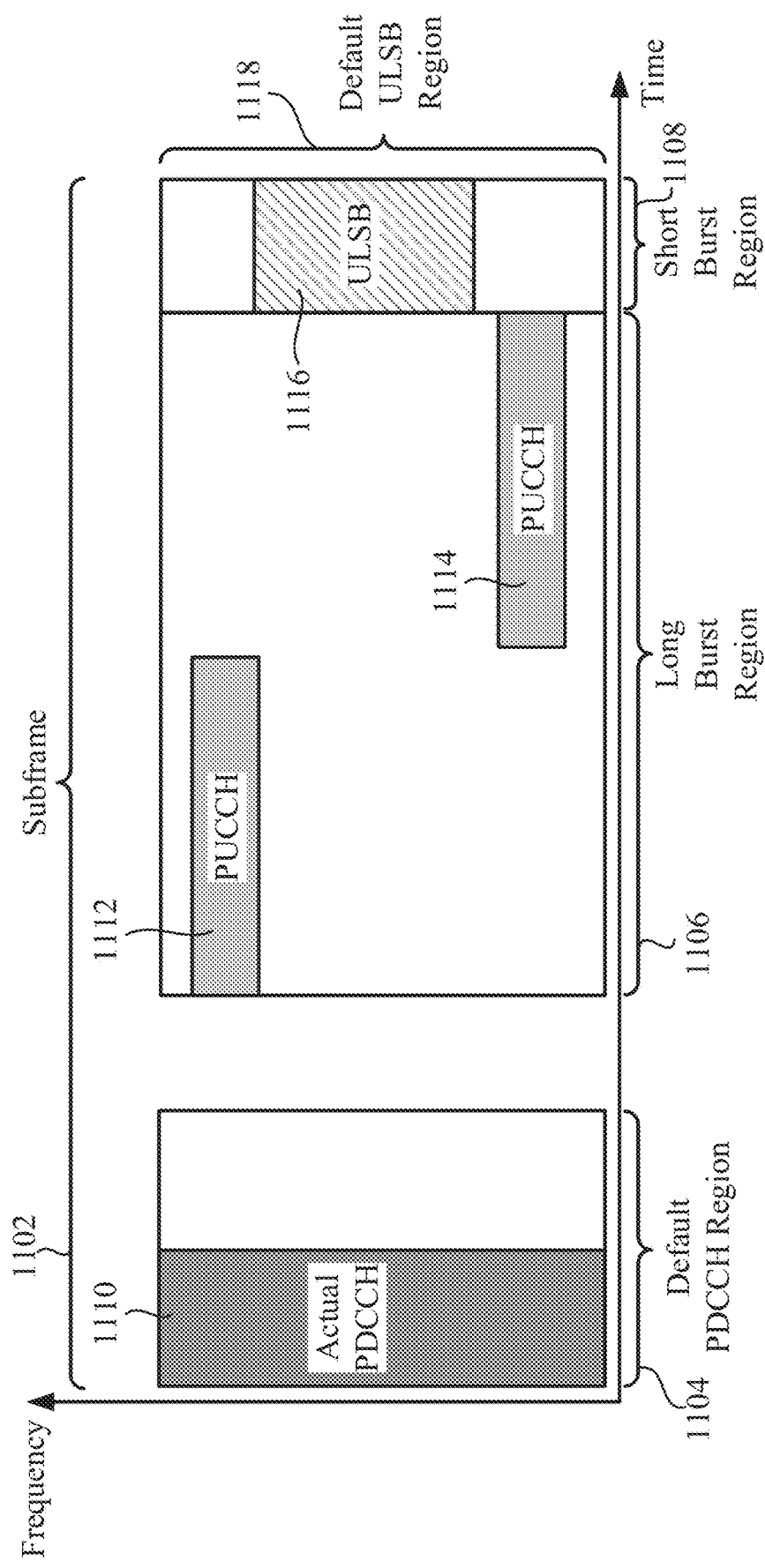
FIG. 11 shows a subframe that includes a default PDCCH region and an uplink region that includes a long burst region and a short burst region according to some embodiments.

The scheduled entity specific long PUCCH duration may also be affected by ULSB. The ULSB may have one or two normal symbol durations. Both TDM and FDM between a short duration PUCCH and a long duration PUCCH may be supported at least for different scheduled entities in one slot. For example, frequency division multiplexing (FDM) between a short PUCCH duration and a long PUCCH duration may result in a possible extension of a long PUCCH duration to the ULSB region. This may be acceptable when the extension is semi-static (e.g., where the long PUCCH duration extends to the ULSB region only when the entire ULSB region occupies a sub-set of the wideband bandwidth). However, when a dynamic long PUCCH extension is extended, scheduled entities may need to monitor PDCCH in order to know whether extension is allowed or not. This may be undesirable when implicit mapping or semi-static configuration of a PUCCH resource is used. Furthermore, if a dynamic configuration of a PUCCH duration is allowed, it may also increase power consumption at the scheduled entity. The scheduled entity may not have a sufficient amount of time to process a PDCCH, decode a DCI containing a PUCCH duration, and apply the decoded information to a PUCCH transmission in the same slot. Therefore, a scheduled entity may need to wake up earlier only to decode PDCCH and determine the configured PUCCH duration, which may result in greater power consumption at the scheduled entity. Therefore, in some aspects of the disclosure, a scheduled entity specific long duration may not exceed a cell-specific long duration as illustrated in FIG. 11. Briefly, FIG. 11 shows a subframe 1102 that includes a default PDCCH region 1104 and an uplink region that includes a long burst region 1106 and a short burst region 1108. FIG. 11 further shows an actual PDCCH 1110, long PUCCH durations 1112, 1114, and a ULSB 1116. As shown in FIG. 11, the ULSB 1116 may be within the default ULSB region 1118. For example, the long PUCCH durations 1112, 1114 may be scheduled entity specific long durations that do not exceed a cell-specific long duration.

In some aspects of the disclosure, a cell specific short duration may be semi-statically configured. In some aspects of the disclosure, a cell specific long duration may be derived based on a slot duration, a semi-static PDCCH region, a cell-specific short duration, and a GAP (e.g., a guard period). In some aspects of the disclosure, the scheduled entity specific short PUCCH duration may be a subset of the cell specific short duration, but may not exceed the cell specific short duration. In some aspects of the disclosure, the scheduled entity specific long PUCCH duration may be a subset of the cell specific long duration, but may not exceed the cell specific long duration.

In some aspects of the disclosure, there may be multiple DL/UL bandwidth parts (BWPs). For example, each BWP may have a different PDCCH region. In some aspects of the disclosure, different uplink BWPs may have different starting positions even when a semi-static configured starting position of a long PUCCH duration is used. When a scheduled entity needs to concurrently transmit PUCCH in different uplink BWPs, the PUCCH in the different uplink BWPs may start at different symbols. This may cause problems with respect to power control and maintaining phase continuity when the latter PUCCH starts. The same also holds true for having different ending symbols. Such problems may be avoided by using the same starting symbols for PUCCH in a long duration for different uplink BWPs. Therefore, in some aspects of the disclosure, a scheduled entity may support the same starting and ending symbols for scheduled entity specific long PUCCH in different uplink BWPs.

In NR, a scheduled entity may need to deliver large UCI payloads. For example, such large UCI payloads may result from multi-bit ACKs and multi-bit SRs. A sub-band CQI report may have more payload bits due to increased wideband bandwidth. A CSI report may also need to include beam related information. When a scheduled entity implements carrier aggregation, the UCI payload size may scale with the number of carriers. In some aspects, NR may support up to 16 component carriers (CCs), and there may be fewer CCs if wider component carriers are used. For example, a large UCI payload may include more than 600 payload bits. On the other hand, a polar code may have up to N=1024 output bits, which means that a single polar code word may not be sufficient for a large payload size (e.g., more than 600 bits). In some aspects of the disclosure, the number of UCI payload bits that a scheduled entity can transmit may be limited to achieve a reduction of the previously described large UCI payloads. Therefore, in such aspects, the number of concurrent CCs within one CSI report may be limited to reduce a UCI payload. In some aspects of the disclosure, the number of concurrent CCs within one CSI report may be limited to five CCs for a spectrum band below approximately 6.0 gigahertz (GHz) (also referred to as "sub-6") and 10 CCs for a millimeter wave spectrum (mm-Wave).

LTE may support semi-persistent scheduling (SPS). In LTE, the PDCCH indicating release of an SPS assignment may be acknowledged by a scheduled entity. This allows the scheduling entity to confirm that the scheduled entity has released the assignment before assigning the SPS resources to other scheduled entities. In NR, there may be commands (e.g., PDCCH commands) issued from a scheduling entity via PDCCH (also referred to as NR PDCCH) for which there is no corresponding PDSCH packet. As such, there may be no natural acknowledgment transmission from the scheduled entity for these commands. In some aspects, if a scheduled entity is able to identify a command in a PDCCH transmission, the scheduled entity may be configured to transmit an acknowledgment to a scheduling entity for such PDCCH transmission. Such acknowledgment may follow similar rules and procedures as ACKs for PDSCH (also referred to as NR PDSCH) with regard to resource allocation. Since there may be no PDSCH, the ACK timing may be related to the corresponding PDCCH timing. For example, in LTE, the SPS related PDCCH may use a different RNTI than the PDSCH. However, this may not be a requirement for considering whether an NR PDCCH needs acknowledgment. One example of a PDCCH transmission for which a scheduled entity may be allowed to acknowledge is a PDCCH transmission that does not schedule any packets, but only indicates a beam change (also referred to as beam switching). This may significantly improve the performance of the scheduled entity since missing this PDCCH transmission may result in beam mismatch between a scheduled entity and a scheduling entity. Therefore, in some aspects of the disclosure, a scheduled entity may be configured to transmit an ACK for PDCCH transmissions from a scheduled entity. In some aspects of the disclosure, a scheduled entity may be configured to transmit an ACK for a PDDCH transmission indicating a beam change.

Implicit/Explicit Signaling Options

Example options for implicit or explicit signaling will now be described. In one aspect of the disclosure, for long duration PUCCH transmissions carrying only ACKS, the scheduled entity may implicitly determine the RB index, cyclic-shift index or spacing, and the OCC. For example, the start and end uplink OFDM symbols (or start and duration) may be set to a default value (e.g., based on a slot format indicator) at the scheduled entity. Alternatively, DCI may indicate an explicit override of any default values. In another aspect of the disclosure, for short duration PUCCH, the number of uplink OFDM symbols (e.g., one or two OFDM symbols) to be used by the scheduled entity may be semi-statically or dynamically configured. In another aspect of the disclosure, the implicit mapping may map one set of PDCCH resources or CCEs to a short PUCCH and another set to a long PUCCH. In another aspect, the CCE indexing ordering may be randomized prior to implicit mapping of CCE index to the PUCCH resource. Such randomization may, for example, be a function of slot index, and may help to reduce the blocking or collision probability for the scheduler.

Figure 12:
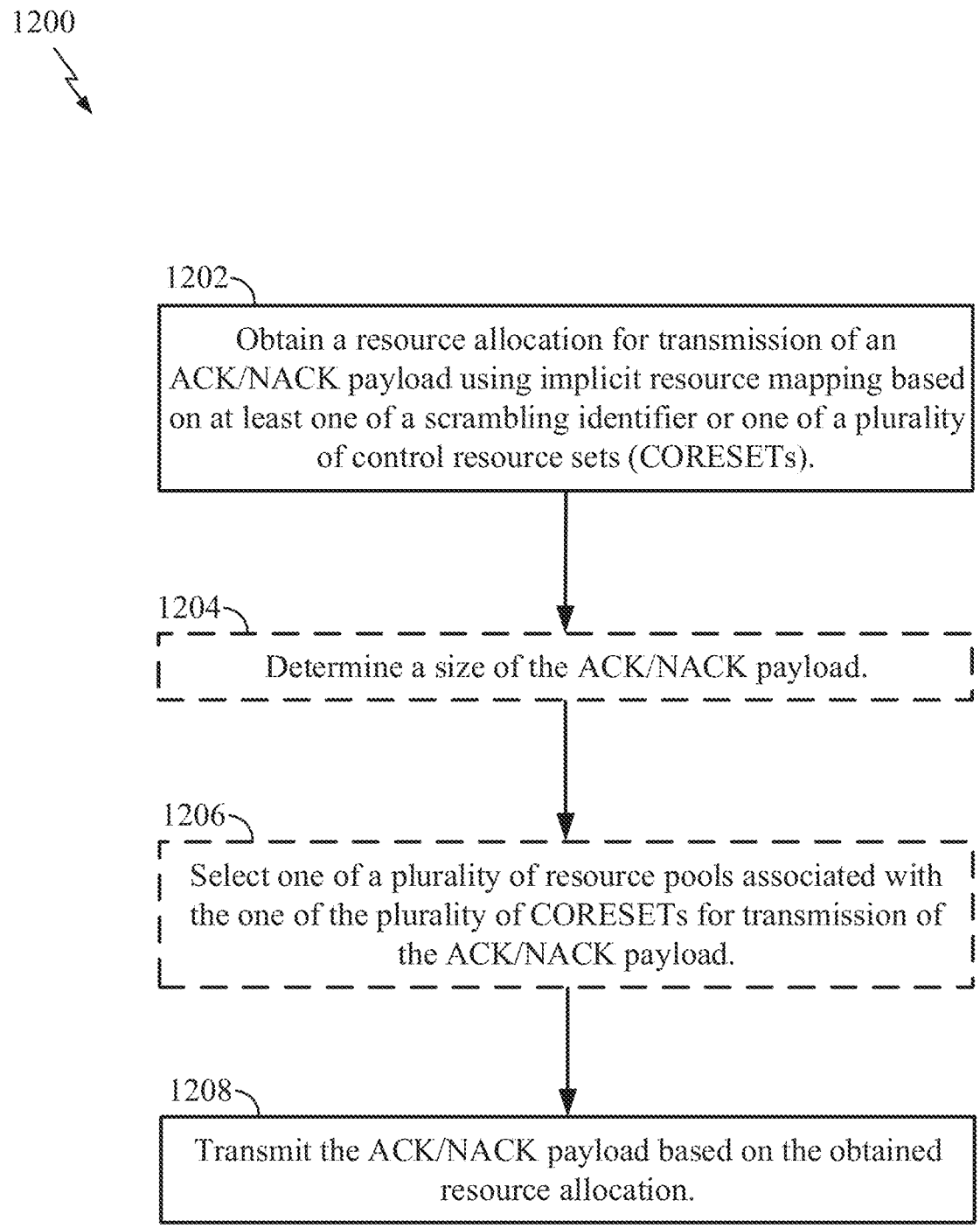
FIG. 12 is a flow chart illustrating an exemplary process for a scheduled entity to communicate with a scheduling entity in a wireless communication network according to some aspects of the disclosure.

FIG. 12 is a flow chart illustrating an exemplary process 1200 for a scheduled entity to communicate with a scheduling entity in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 700 illustrated in FIG. 7.

At block 1202, the scheduled entity obtains a resource allocation for transmission of an ACK/NACK payload using implicit resource mapping based on at least one of a scrambling identifier or one of a plurality of CORESETs. At block 1204, the scheduled entity determines a size of the ACK/NACK payload. At block 1206, the scheduled entity selects one of a plurality of resource pools associated with the one of the plurality of CORESETs for transmission of the ACK/NACK payload. At block 1208, the scheduled entity transmits the ACK/NACK payload based on the obtained resource allocation. In some aspects of the disclosure, the implicit resource mapping is further based on a starting control channel element (CCE) of a downlink control channel. In some aspects of the disclosure, the one of the plurality of CORESETs is associated with a unique offset to be applied from the starting CCE. In some aspects of the disclosure, the one of the plurality of resource pools is selected based on the size of the ACK/NACK payload. In some aspects of the disclosure, the scrambling identifier and/or one of the plurality of CORESETs is indicated in an acknowledgment resource indictor (ARI) in DCI.

Figure 13:
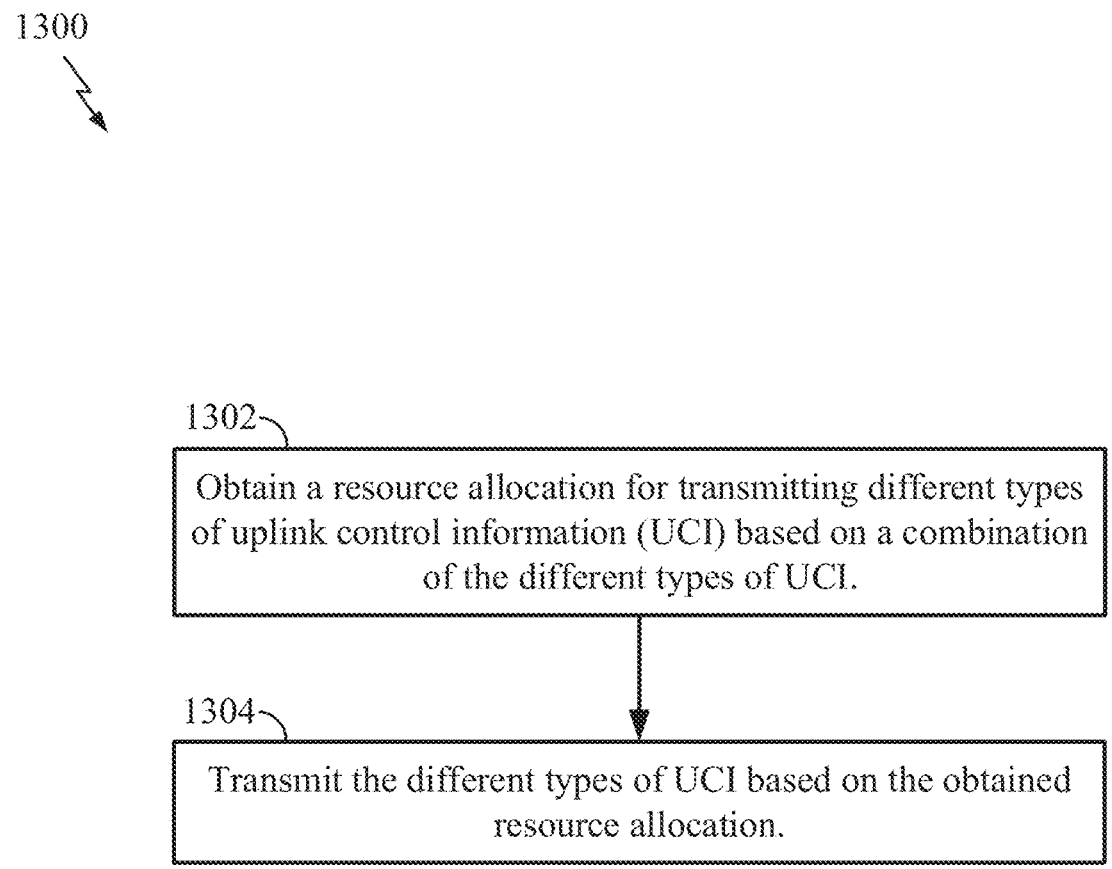
FIG. 13 is a flow chart illustrating an exemplary process for a scheduled entity to communicate with a scheduling entity in a wireless communication network according to some aspects of the disclosure.

FIG. 13 is a flow chart illustrating an exemplary process 1300 for a scheduled entity to communicate with a scheduling entity in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 700 illustrated in FIG. 7.

At block 1302, the scheduled entity obtains a resource allocation for transmitting different types of UCI based on a combination of the different types of UCI. At block 1304, the scheduled entity transmits the different types of UCI based on the obtained resource allocation. In some aspects of the disclosure, the different types of UCI include a channel quality indicator (CQI) and one or more ACK/NACK bits. In such aspects of the disclosure, the one or more ACK/NACK bits are transmitted using resources allocated to the CQI. In an aspect of the disclosure, the different types of UCI include a plurality of ACK bits and a one bit scheduling request. In such aspects of the disclosure, the one bit scheduling request is transmitted with the plurality of ACK bits when the plurality of ACK bits exceeds a threshold.

Figure 14:
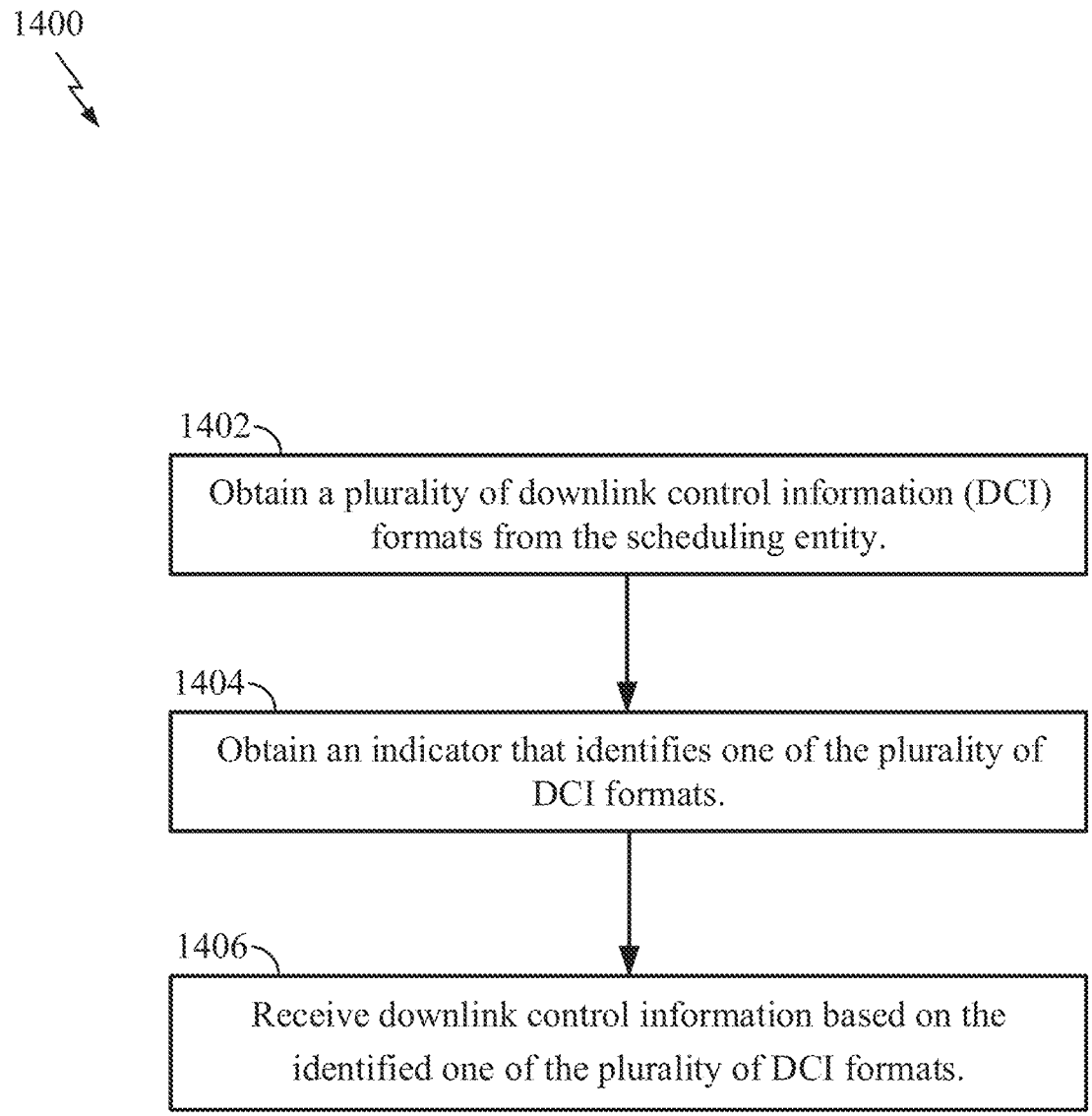
FIG. 14 is a flow chart illustrating an exemplary process for a scheduled entity to communicate with a scheduling entity in a wireless communication network according to some aspects of the disclosure.

FIG. 14 is a flow chart illustrating an exemplary process 1400 for a scheduled entity to communicate with a scheduling entity in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduled entity 700 illustrated in FIG. 7.

At block 1402, the scheduled entity obtains a plurality of DCI formats from the scheduling entity. Each of the plurality of DCI formats may include a different amount of information for dynamic scheduling. At block 1404, the scheduled entity obtains an indicator that identifies one of the plurality of DCI formats. At block 1406, the scheduled entity receives DCI based on the identified one of the plurality of DCI formats. In some aspects of the disclosure, the indicator is obtained in a radio resource configuration (RRC) message from the scheduling entity. In some aspects of the disclosure, each of the plurality of DCI formats includes a different number of information fields, each of the information fields being associated with a distinct feature.

Figure 15:
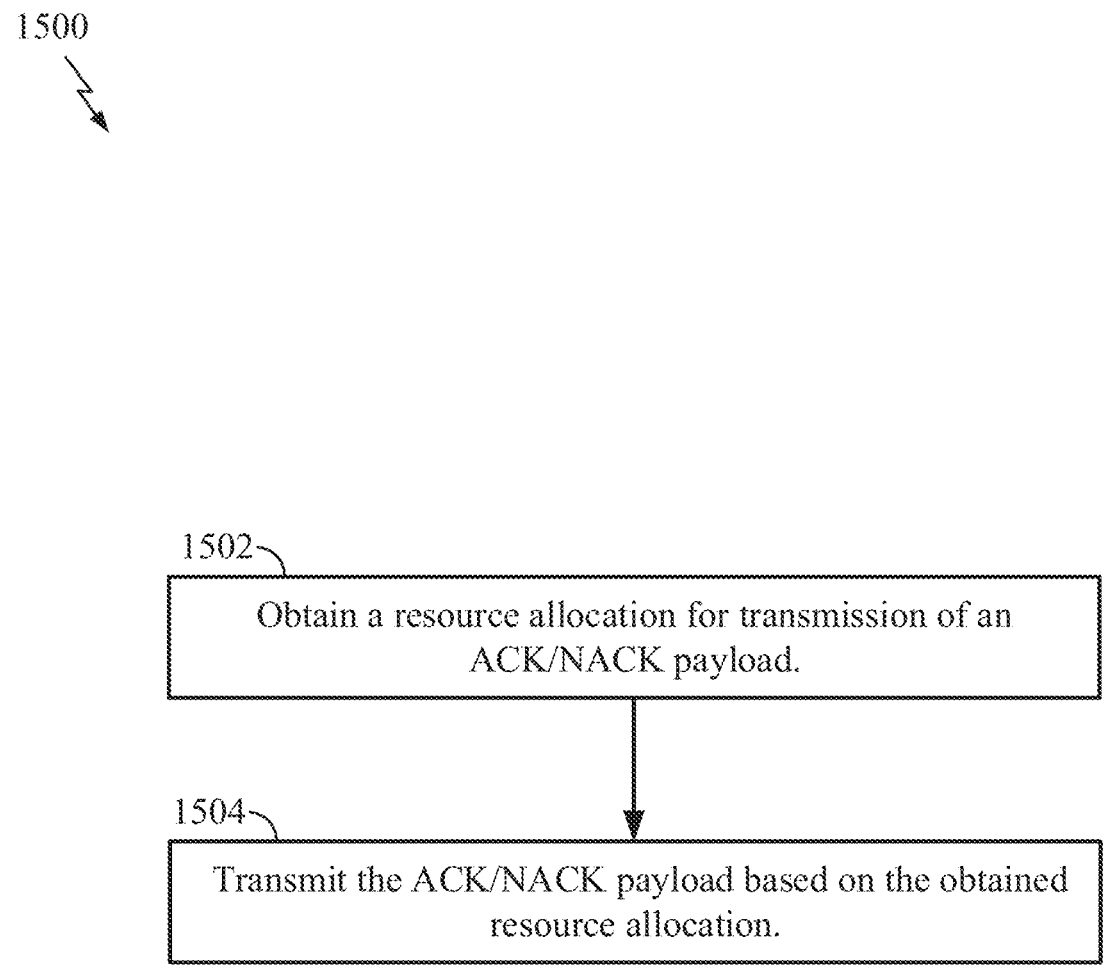
FIG. 15 is a flow chart illustrating an exemplary process for a scheduled entity to communicate with a scheduling entity in a wireless communication network according to some aspects of the disclosure.

FIG. 15 is a flow chart illustrating an exemplary process 1500 for a scheduled entity to communicate with a scheduling entity in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity 700 illustrated in FIG. 7.

At block 1502, the scheduled entity obtains a resource allocation for transmission of an ACK/NACK payload. The resource allocation is obtained using an implicit mapping that identifies an uplink control channel resource based on at least one of a starting resource block index, a first shift index, or a time domain OCC. At block 1504, the scheduled entity transmits the ACK/NACK payload based on the obtained resource allocation. In some aspects of the disclosure, the starting resource block index is included in a first hop when frequency hopping is enabled. In some aspects of the disclosure, the first shift index is included in a first symbol of a subframe. In some aspects of the disclosure, the orthogonal cover code is derived based on a number of data and demodulation reference signal (DMRS) symbols in a slot of a subframe and whether frequency hopping is enabled.

Figure 16:
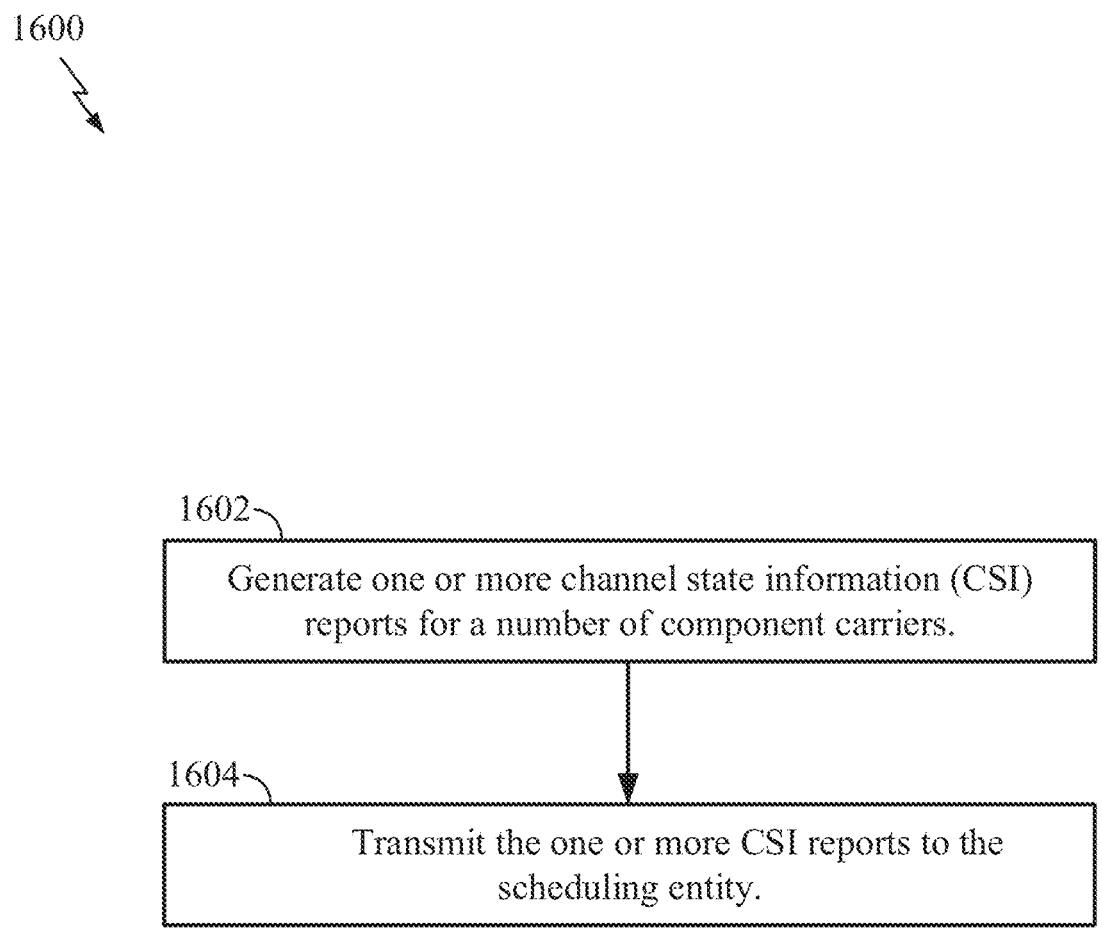
FIG. 16 is a flow chart illustrating an exemplary process for a scheduled entity to communicate with a scheduling entity in a wireless communication network according to some aspects of the disclosure.

FIG. 16 is a flow chart illustrating an exemplary process 1600 for a scheduled entity to communicate with a scheduling entity in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity 700 illustrated in FIG. 7.

At block 1602, the scheduled entity generates one or more channel state information (CSI) reports for a number of component carriers. In some aspects of the disclosure, the scheduled entity may generate a CSI report for a number of component carriers when the number of component carriers is less than or equal to a threshold. In one example, the threshold may be five component carriers when a spectrum band below approximately 6.0 gigahertz is used. In another example, the threshold may be 10 component carriers when a millimeter wave spectrum is used. At block 1604, the scheduled entity transmits the one or more CSI reports to the scheduling entity.

Figure 17:
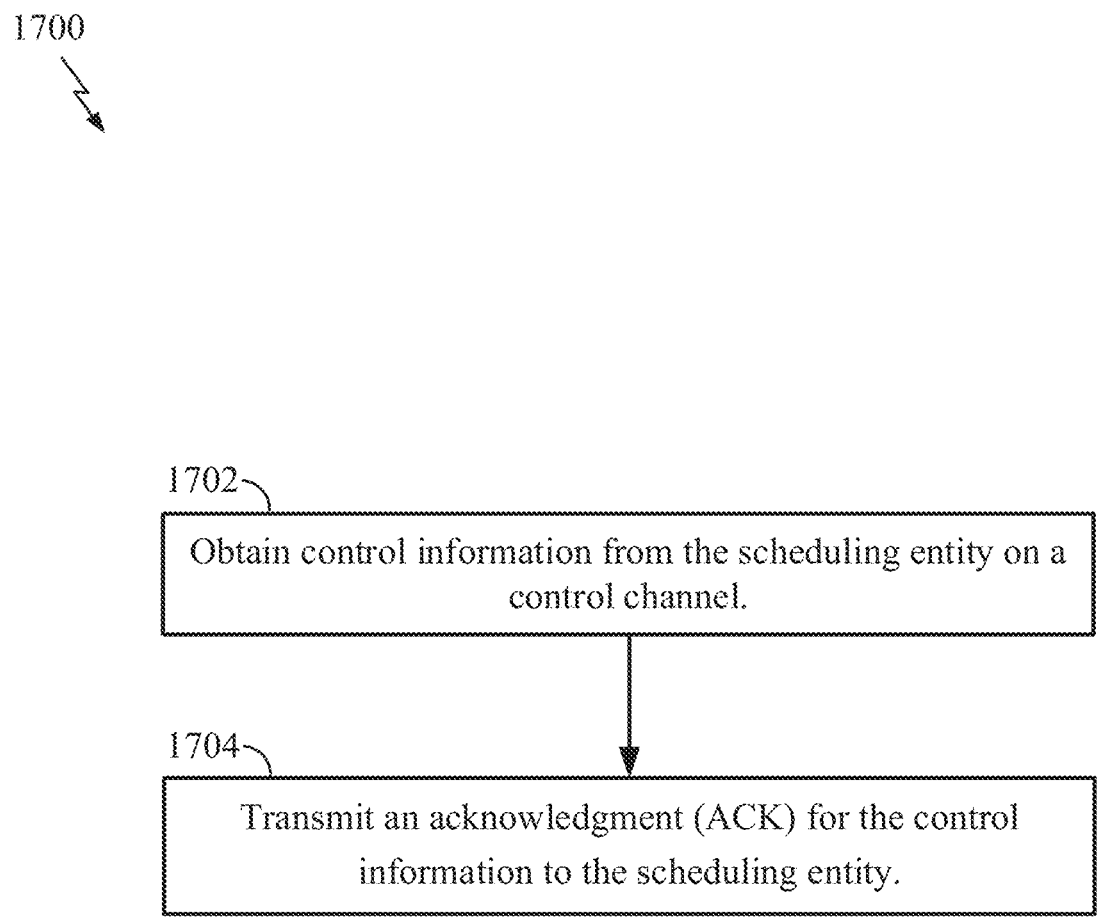
FIG. 17 is a flow chart illustrating an exemplary process for a scheduled entity to communicate with a scheduling entity in a wireless communication network according to some aspects of the disclosure.

FIG. 17 is a flow chart illustrating an exemplary process 1700 for a scheduled entity to communicate with a scheduling entity in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduled entity 700 illustrated in FIG. 7.

At block 1702, the scheduled entity obtains control information from the scheduling entity on a control channel. At block 1704, the scheduled entity transmits an ACK for the control information to the scheduling entity. In some aspects of the disclosure, the control information includes an indication to perform an operation at the scheduled entity. In some aspects of the disclosure, the operation is a beam switching operation. In some aspects of the disclosure, the control information has a priority value that exceeds a threshold priority value.

Figure 18:
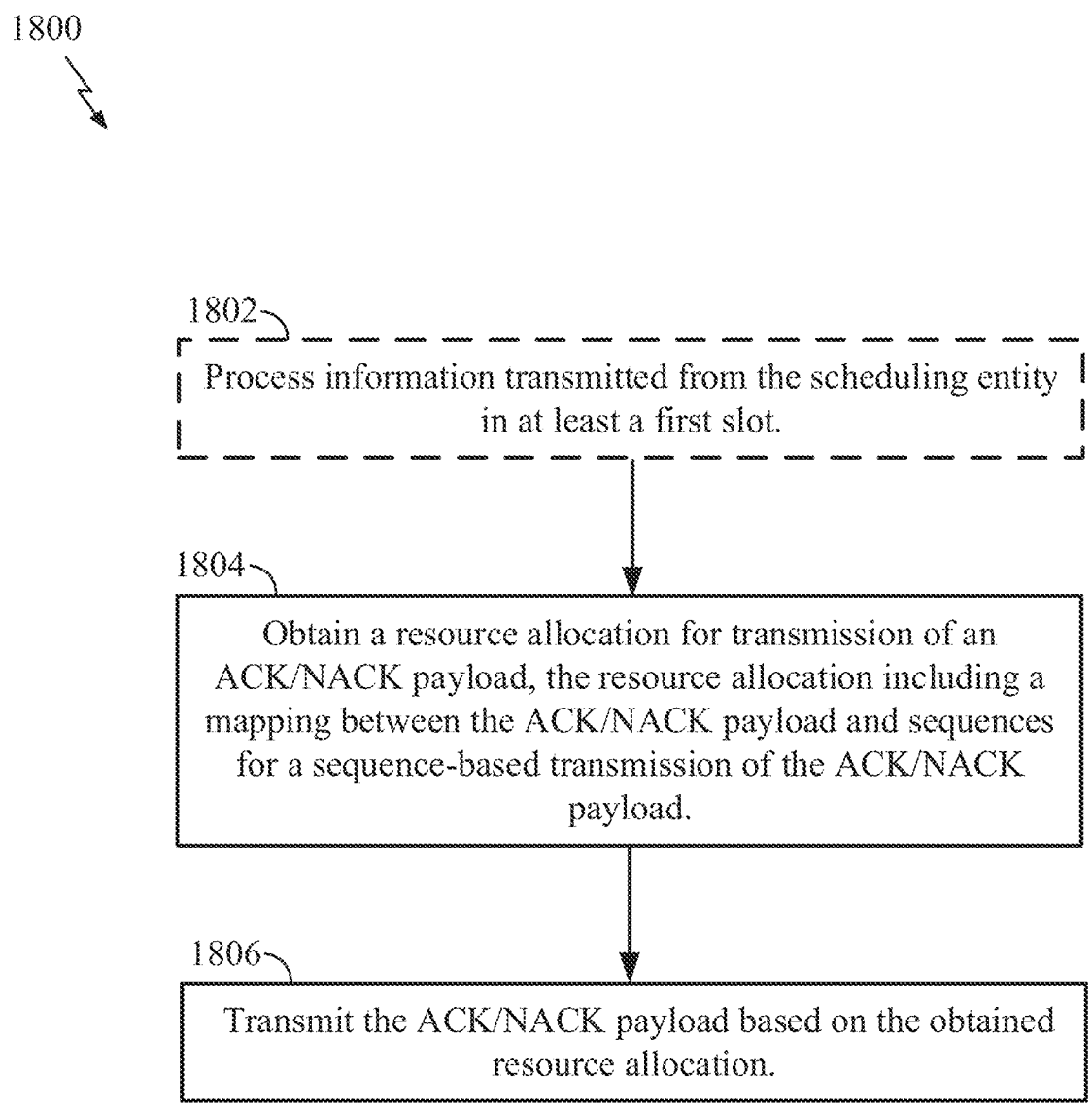
FIG. 18 is a flow chart illustrating an exemplary process for a scheduled entity to communicate with a scheduling entity in a wireless communication network according to some aspects of the disclosure.

FIG. 18 is a flow chart illustrating an exemplary process 1800 for a scheduled entity to communicate with a scheduling entity in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity 700 illustrated in FIG. 7.

At block 1802, the scheduled entity optionally processes information transmitted from the scheduling entity in at least a first slot. At block 1804, the scheduled entity obtains a resource allocation for transmission of an ACK/NACK payload. The scheduled entity obtains the resource allocation by mapping to one of a plurality of sequences for a sequence-based transmission of the ACK/NACK payload. In some aspects, the mapping varies with time based on one or more parameters. In some aspects of the disclosure, the ACK/NACK payload is associated with the information in at least the first slot. At block 1806, the scheduled entity transmits the ACK/NACK payload based on the obtained resource allocation.

In some aspects of the disclosure, the one or more parameters include at least one of an initial slot, a current slot, an orthogonal frequency division multiplexing (OFDM) symbol index, an identifier of the scheduled entity, a retransmission attempt index, or a redundancy version (RV) identifier.

In some aspects of the disclosure, each of the plurality of sequences is individually configured based on an implicit or explicit configuration. In some aspects of the disclosure, the plurality of sequences are equally spaced cyclic-shifts of a common base sequence. In some aspects of the disclosure, at least one of a shift spacing for the equally spaced cyclic-shifts or a minimum shift for the equally spaced cyclic-shifts is configured based on an implicit or explicit configuration. In some aspects of the disclosure, one or more of the plurality of sequences are configured with different power offsets.

In some aspects of the disclosure, the mapping is based on an implicit mapping function that is implemented using one or more function inputs. In one example, the one or more function inputs may include a resource allocation parameter of a downlink control channel resource that triggers UCI, downlink control channel payload contents, and/or contents of a scheduled downlink shared channel. In some aspects of the disclosure, the resource allocation parameter includes at least one of a control channel element (CCE) index within a CORESET, a CORESET index, a bandwidth part index, or a radio network temporary identifier (RNTI) for scrambling the downlink control channel. In another example, the one or more function inputs may include downlink shared channel contents or downlink control channel payload contents. In some aspects of the disclosure, the downlink control channel payload contents may include information of a scheduled downlink shared channel resource, a rank, a modulation and coding scheme (MCS), a waveform, and/or details of a downlink control channel order or instruction.

In one example configuration, the apparatus 700 for wireless communication may include means for obtaining a resource allocation for transmission of an ACK/NACK payload using implicit resource mapping based on at least one of a scrambling identifier or one of a number of CORESETs. The apparatus 700 may further include means for determining a size of the ACK/NACK payload. The apparatus 700 may further include means for selecting one of a plurality of resource pools associated with the one of the plurality of CORESETs for transmission of the ACK/NACK payload. The apparatus 700 may further include means for transmitting the ACK/NACK payload based on the obtained resource allocation.

In another example configuration, the apparatus 700 for wireless communication may include means for obtaining a resource allocation for transmitting different types of UCI. For example, the resource allocation may be based on a combination of the different types of UCI. The apparatus 700 may further include means for transmitting the different types of UCI based on the obtained resource allocation.

In another example configuration, the apparatus 700 for wireless communication may include means for obtaining a plurality of DCI formats from the scheduling entity. For example, each of the plurality of DCI formats may include a different amount of information for dynamic scheduling. The apparatus 700 may further include means for obtaining an indicator that identifies one of the plurality of DCI formats. The apparatus 700 may further include means for receiving DCI based on the identified one of the plurality of DCI formats.

In another example configuration, the apparatus 700 for wireless communication may include means for obtaining a resource allocation for transmission of an ACK/NACK payload. For example, the resource allocation may be obtained using an implicit mapping that identifies an uplink control channel resource based on at least one of a starting resource block index, a first shift index, or a time domain OCC. The apparatus 700 may further include means for transmitting the ACK/NACK payload based on the obtained resource allocation.

In another example configuration, the apparatus 700 for wireless communication may include means for generating one or more channel state information (CSI) reports for a number of component carriers. The apparatus 700 may further include means for transmitting the one or more CSI reports to the scheduling entity.

In another example configuration, the apparatus 700 for wireless communication may include means for obtaining control information from the scheduling entity on a control channel. The apparatus 700 may further include means for transmitting an ACK for the control information to the scheduling entity.

In another example configuration, the apparatus 700 for wireless communication may include means for processing information transmitted from the scheduling entity in at least a first slot. The apparatus 700 may further include means for obtaining a resource allocation for transmission of an ACK/NACK payload. For example, the resource allocation may be obtained by mapping to one of a plurality of sequences for a sequence-based transmission of the ACK/NACK payload. The mapping may vary with time based on one or more parameters. The apparatus 700 may further include means for transmitting the ACK/NACK payload based on the obtained resource allocation.

In one aspect of the disclosure, the aforementioned means may be the processor(s) 704 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1 and/or 2, and utilizing, for example, the processes and/or algorithms described herein in relation to FIGS. 12-18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "obtaining" may include one or more actions including, but not limited to, receiving, acquiring, determining, or any combination thereof.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a scheduled entity to communicate with a scheduling entity in a wireless communication network, the method comprising:
    selecting a resource for transmission of an acknowledgment (ACK)/negative acknowledgment (NACK) using implicit resource mapping utilizing one or more function inputs based on an index of a starting control channel element (CCE) of a downlink control channel of one of a plurality of control resource sets (CORESETs), the index describing a location of the starting control channel element within the one CORESET of the plurality of CORESETs, wherein the resource is selected by mapping the index of the starting CCE to one of a plurality of sequences for a sequence-based transmission of the ACK/NACK; and
    transmitting the ACK/NACK based on the selected resource.

2. The method of claim 1, wherein the one of the plurality of control resource sets (CORESETs) is associated with a unique offset to be applied from the starting CCE.

3. The method of claim 1, further comprising:
    selecting one of a plurality of resource pools associated with the one of the plurality of control resource sets (CORESETs) for transmission of the ACK/NACK.

4. The method of claim 1, further comprising:
    selecting one of a plurality of resource pools based on a size of a payload of the ACK/NACK.

5. The method of claim 1, wherein the one of the plurality of control resource sets (CORESETs) is indicated in an acknowledgment resource indictor (ARI) in downlink control information (DCI).

6. An apparatus for wireless communication, comprising:
    at least one processor;
    a transceiver communicatively coupled to the at least one processor; and
    a memory communicatively coupled to the at least one processor,
    wherein the at least one processor is configured to:
        select a resource for transmission of an acknowledgment (ACK)/negative acknowledgment (NACK) using implicit resource mapping utilizing one or more function inputs based on an index of a starting control channel element (CCE) of a downlink control channel of one of a plurality of control resource sets (CORESETs), the index describing a location of the starting control channel element within the one CORESET of the plurality of CORESETs, wherein the resource is selected by mapping the index of the starting CCE to one of a plurality of sequences for a sequence-based transmission of the ACK/NACK; and
        transmit the ACK/NACK based on the selected resource.

7. The apparatus of claim 6, wherein the one of the plurality of control resource sets (CORESETs) is associated with a unique offset to be applied from the starting CCE.

8. The apparatus of claim 6, wherein the at least one processor is further configured to:
    select one of a plurality of resource pools associated with the one of the plurality of control resource sets (CORESETs) for transmission of the ACK/NACK.

9. The apparatus of claim 6, wherein the at least one processor is further configured to:

select one of a plurality of resource pools based on a size of a payload of the ACK/NACK.

10. The apparatus of claim 6, wherein the one of the plurality of control resource sets (CORESETs) is indicated in an acknowledgment resource indictor (ARI) in downlink control information (DCI).

11. A non-transitory computer-readable medium storing computer-executable code, comprising code for causing a computer to:
select a resource for transmission of an acknowledgment (ACK)/negative acknowledgment (NACK) using implicit resource mapping utilizing one or more function inputs based on an index of a starting control channel element (CCE) of a downlink control channel of one of a plurality of control resource sets (CORESETs), the index describing a location of the starting control channel element within the one CORESET of the plurality of CORESETs, wherein the resource is selected by mapping the index of the starting CCE to one of a plurality of sequences for a sequence-based transmission of the ACK/NACK; and
transmit the ACK/NACK based on the selected resource.

12. A method for a scheduled entity to communicate with a scheduling entity in a wireless communication network, the method comprising:
selecting a resource for transmission of an acknowledgment (ACK)/negative acknowledgment (NACK), wherein the resource is selected by mapping one or more function inputs to one of a plurality of sequences for a sequence-based transmission of the ACK/NACK, wherein the mapping varies with time based on one or more parameters, wherein the mapping is based on an implicit mapping function that is implemented using the one or more function inputs, wherein the one or more function inputs include a resource allocation parameter of a downlink control channel resource that triggers uplink control information (UCI); and
transmitting the ACK/NACK based on the selected resource.

13. The method of claim 12, wherein the one or more parameters include at least one of an initial slot number, a current slot number, an orthogonal frequency division multiplexing (OFDM) symbol index, an identifier of the scheduled entity, a retransmission attempt index, or a redundancy version (RV) identifier.

14. The method of claim 12, wherein the plurality of sequences are equally spaced cyclic-shifts of a common base sequence.

15. The method of claim 12, wherein one or more of the plurality of sequences are configured with different power offsets.

16. The method of claim 12, wherein the one or more function inputs include at least one of downlink control channel payload contents, a resource allocation of a scheduled downlink shared channel, or contents of the scheduled downlink shared channel.

17. The method of claim 12, wherein the resource allocation parameter includes at least one of a control channel element (CCE) index within a core resource set (CORESET), a CORESET index, a bandwidth part index, or a radio network temporary identifier (RNTI) for scrambling the downlink control channel.

18. The method of claim 12, wherein the one or more function inputs include at least one of downlink shared channel contents or downlink control channel payload contents.

19. The method of claim 18, wherein the downlink control channel payload contents include at least one of information of a scheduled downlink shared channel resource, a rank, a modulation and coding scheme (MCS), a waveform, or details of a downlink control channel order or instruction.

20. The method of claim 12, further comprising:
processing information transmitted from the scheduling entity in at least a first slot, wherein the ACK/NACK is associated with the information in at least the first slot.

21. The method of claim 12, wherein the ACK/NACK is transmitted using frequency hopping based on a radio resource configuration from the scheduling entity.

22. The method of claim 21, wherein a resource block allocation for a second frequency hop is a function of at least a resource block allocation of a first frequency hop.

23. The method of claim 21, wherein a resource block allocation for a second frequency hop is a function of a resource block allocation of a first frequency hop and a slot index.

24. An apparatus for wireless communication, comprising:
at least one processor;
a transceiver communicatively coupled to the at least one processor; and
a memory communicatively coupled to the at least one processor,
wherein the at least one processor is configured to:
select a resource for transmission of an acknowledgment (ACK)/negative acknowledgment (NACK), wherein the resource is selected by mapping one or more function inputs to one of a plurality of sequences for a sequence-based transmission of the ACK/NACK, wherein the mapping varies with time based on one or more parameters wherein the mapping is based on an implicit mapping function that is implemented using the one or more function inputs, wherein the one or more function inputs include a resource allocation parameter of a downlink control channel resource that triggers uplink control information (UCI); and
transmit the ACK/NACK based on the selected resource.

25. The apparatus of claim 24, wherein the one or more parameters include at least one of an initial slot number, a current slot number, an orthogonal frequency division multiplexing (OFDM) symbol index, an identifier of the apparatus, a retransmission attempt index, or a redundancy version (RV) identifier.

26. The apparatus of claim 24, wherein the plurality of sequences are equally spaced cyclic-shifts of a common base sequence.

27. The apparatus of claim 24, wherein one or more of the plurality of sequences are configured with different power offsets.

28. The apparatus of claim 24, wherein the one or more function inputs include downlink control channel payload contents, or contents of a scheduled downlink shared channel.

29. The apparatus of claim 24, wherein the resource allocation parameter includes at least one of a control channel element (CCE) index within a core resource set (CORESET), a CORESET index, a bandwidth part index, or a radio network temporary identifier (RNTI) for scrambling the downlink control channel.

30. The apparatus of claim 24, wherein the one or more function inputs include at least one of downlink shared channel contents or downlink control channel payload contents.

31. The apparatus of claim 30, wherein the downlink control channel payload contents include at least one of information of a scheduled downlink shared channel resource, a rank, a modulation and coding scheme (MCS), a waveform, or details of a downlink control channel order or instruction.

32. The apparatus of claim 24, wherein the at least one processor is further configured to:
process information transmitted from a scheduling entity in at least a first slot, wherein the ACK/NACK is associated with the information in at least the first slot.

33. The apparatus of claim 24, wherein the ACK/NACK is transmitted using frequency hopping based on a radio resource configuration from a scheduling entity.

34. The apparatus of claim 33, wherein a resource block allocation for a second frequency hop is a function of at least a resource block allocation of a first frequency hop.

35. The apparatus of claim 33, wherein a resource block allocation for a second frequency hop is a function of a resource block allocation of a first frequency hop and a slot index.

36. A non-transitory computer-readable medium storing computer-executable code, comprising code for causing a computer to:
select a resource for transmission of an acknowledgment (ACK)/negative acknowledgment (NACK), wherein the resource is selected by mapping one or more function inputs to one of a plurality of sequences for a sequence-based transmission of the ACK/NACK, wherein the mapping varies with time based on one or more parameters, wherein the mapping is based on an implicit mapping function that is implemented using the one or more function inputs, wherein the one or more function inputs include a resource allocation parameter of a downlink control channel resource that triggers uplink control information (UCI); and
transmit the ACK/NACK based on the selected resource allocation.

* * * * *